United States Patent
Carmack et al.

(10) Patent No.: US 10,466,700 B1
(45) Date of Patent: Nov. 5, 2019

(54) DETECTING OF NAVIGATION DATA SPOOFING BASED ON SIGNAL STRENGTH VARIANCE

(71) Applicant: Amazon Technologies, Inc., Seattle, WA (US)

(72) Inventors: Scott Gerard Carmack, Issaquah, WA (US); Nima Sharifi Mehr, Vancouver (CA); Narasimha Rao Lakkakula, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 15/714,860

(22) Filed: Sep. 25, 2017

Related U.S. Application Data

(63) Continuation-in-part of application No. 14/866,706, filed on Sep. 25, 2015, now Pat. No. 9,849,978.

(51) Int. Cl.
| | | |
|---|---|---|
| *G05D 1/00* | (2006.01) | |
| *G06N 20/00* | (2019.01) | |
| *G06Q 10/08* | (2012.01) | |
| *G05D 1/10* | (2006.01) | |
| *G01S 19/21* | (2010.01) | |

(Continued)

(52) U.S. Cl.
CPC ......... *G05D 1/0088* (2013.01); *B64C 39/024* (2013.01); *G01S 19/215* (2013.01); *G05D 1/101* (2013.01); *G06N 20/00* (2019.01); *G06Q 10/083* (2013.01); *G08G 5/0091* (2013.01); *B64C 2201/127* (2013.01); *B64C 2201/128* (2013.01);
(Continued)

(58) Field of Classification Search
CPC ...... G05D 1/0088; G05D 1/101; G06N 20/00; G06Q 10/083; G01S 19/215; G08G 5/0091; B64C 39/024; B64C 2201/146; B64C 2201/141; B64C 2201/127; B64C 2201/128; G06K 9/6215
See application file for complete search history.

(56) References Cited

U.S. PATENT DOCUMENTS

| | | |
|---|---|---|
| 6,771,214 B2 | 8/2004 | Kober et al. |
| 7,409,290 B2 | 8/2008 | Lin |

(Continued)

FOREIGN PATENT DOCUMENTS

| | | |
|---|---|---|
| WO | 2012021547 | 2/2012 |
| WO | 2016154949 | 10/2016 |

OTHER PUBLICATIONS

U.S. Appl. No. 14/866,706, "Non-Final Office Action", dated Apr. 20, 2017, 16 pages.

(Continued)

*Primary Examiner* — Abby Y Lin
*Assistant Examiner* — Kelly D Williams
(74) *Attorney, Agent, or Firm* — Kilpatrick Townsend & Stockton LLP

(57) ABSTRACT

Techniques for determining whether data associated with an autonomous/non-autonomous operation of a manned/unmanned vehicle may be trusted. For example, a first set of data may be provided from a source external to a manned/unmanned vehicle. A second set of data may be accessed. This second set may be provided from a source internal or external to the manned/unmanned vehicle and may be associated with the same autonomous/non-autonomous operation. The two sets may be compared to determine whether the first set of data may be trusted or not. If untrusted, a corrective action may be performed.

20 Claims, 15 Drawing Sheets

(51) Int. Cl.
*G08G 5/00* (2006.01)
*B64C 39/02* (2006.01)
*G06K 9/62* (2006.01)

(52) U.S. Cl.
CPC .. *B64C 2201/141* (2013.01); *B64C 2201/146* (2013.01); *G06K 9/6215* (2013.01)

(56) References Cited

U.S. PATENT DOCUMENTS

| | | | |
|---|---|---|---|
| 7,546,187 | B2 | 6/2009 | Redman et al. |
| 8,315,794 | B1 | 11/2012 | Strelow et al. |
| 9,254,363 | B2 | 2/2016 | Malamud et al. |
| 9,359,074 | B2 | 6/2016 | Ganesh et al. |
| 9,689,686 | B1 | 6/2017 | Carmack et al. |
| 9,725,171 | B1 | 8/2017 | Carmack et al. |
| 2013/0002477 | A1 | 1/2013 | Dehnie et al. |
| 2014/0172194 | A1 | 6/2014 | Levien et al. |
| 2014/0222248 | A1 | 8/2014 | Levien et al. |
| 2015/0046017 | A1 | 2/2015 | Torti et al. |
| 2015/0061043 | A1 | 3/2015 | Bolognia |
| 2015/0127239 | A1 | 5/2015 | Breed et al. |
| 2015/0203213 | A1 | 7/2015 | Levien et al. |
| 2015/0234053 | A1 | 8/2015 | Psiaki et al. |
| 2015/0260526 | A1 | 9/2015 | Paduano et al. |
| 2015/0283701 | A1 | 10/2015 | Izhikevich et al. |
| 2015/0292887 | A1 | 10/2015 | Haglund et al. |
| 2016/0210525 | A1 | 7/2016 | Yang et al. |

OTHER PUBLICATIONS

U.S. Appl. No. 14/866,706, "Notice of Allowance", dated Aug. 29, 2017, 7 pages.
U.S. Appl. No. 14/866,719, filed Sep. 25, 2015, Titled: Detecting of Navigation Data Spoofing Based on Image Data.
U.S. Appl. No. 14/866,743, filed Sep. 25, 2015, Titled: Analyzing Navigation Data to Detect Navigation Data Spoofing.
U.S. Appl. No. 14/866,745, Communication of Navigation Data Spoofing Between Unmanned Vehicles, Sep. 25, 2015,

DETECTING OF NAVIGATION DATA SPOOFING BASED ON SIGNAL STRENGTH VARIANCE

CROSS REFERENCE TO RELATED APPLICATIONS

This application is a Continuation-In-Part of U.S. Non-Provisional patent application Ser. No. 14/866,706, filed Sep. 25, 2015, and titled "DETECTING OF NAVIGATION DATA SPOOFING BASED ON SENSOR DATA," the content of which is herein incorporated by reference in its entirety.

BACKGROUND

Unmanned vehicles may provide different operations, some of which may be autonomous and support various applications. For example, an unmanned aerial vehicle (UAV) may be used as an autonomous delivery vehicle associated with an electronic marketplace. The electronic marketplace may offer items and selectable delivery methods. Based on a selected delivery method, the UAV may be deployed to deliver a purchased item. The UAV may be configured to autonomously perform various delivery-related operations, such as autonomously flying between a source and a destination.

The unmanned vehicles may rely on externally and internally generated data to perform some of the operations. Referring back to the UAV example, to autonomously fly between the source and the destination, the UAV may use global positioning system (GPS) data, or some other navigation data, received from a satellite-based system. In certain situations, proper execution of autonomous operations may depend on using trusted data. For instance, the UAV may properly deliver the purchased item to the destination if the GPS data is reliable.

BRIEF DESCRIPTION OF THE DRAWINGS

Various embodiments in accordance with the present disclosure will be described with reference to the drawings, in which.

DETAILED DESCRIPTION

Figure 1:
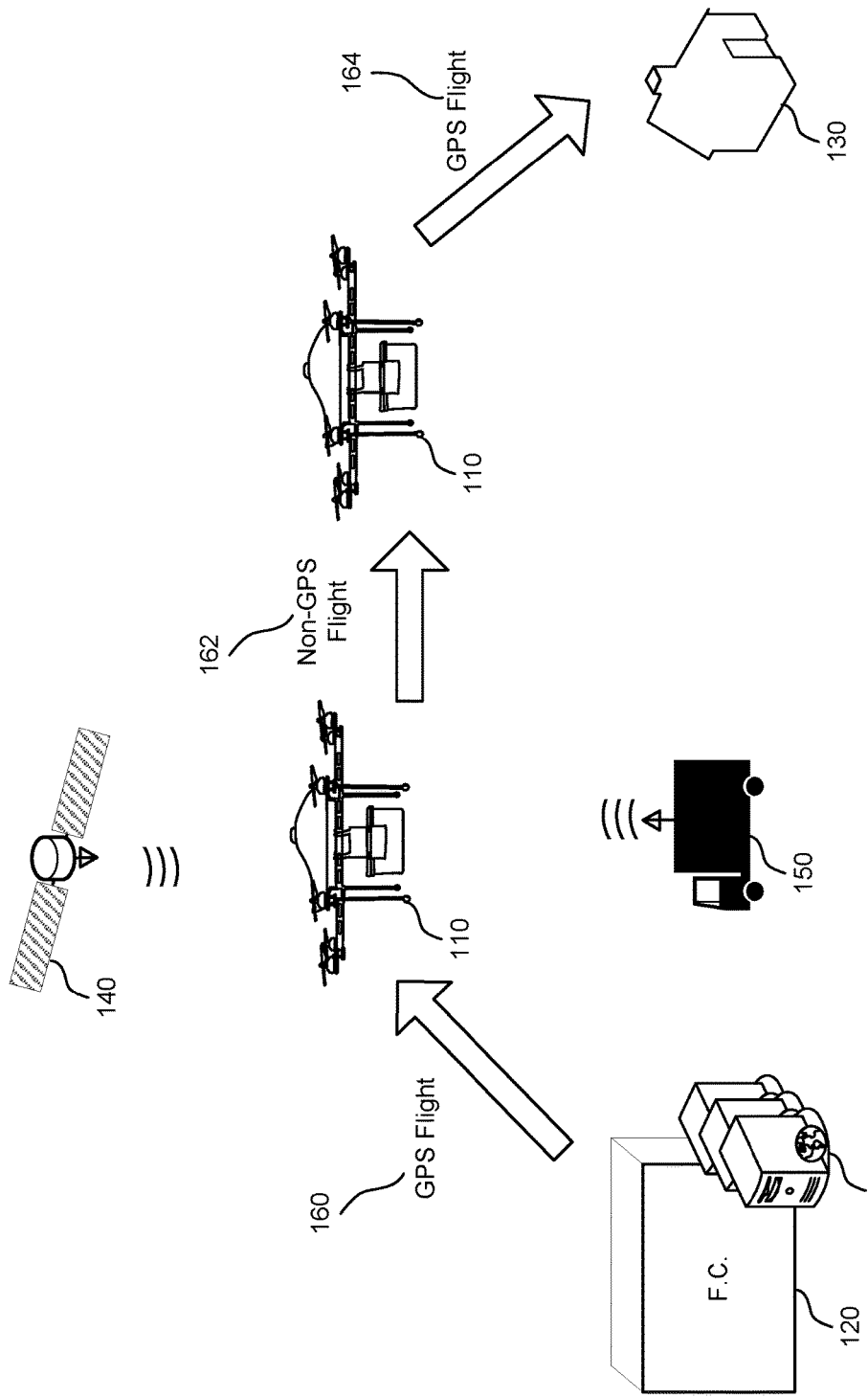
FIG. 1 illustrates an example environment for autonomous operations of an unmanned vehicle, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Although examples herein may refer to unmanned vehicles and/or aerial vehicles for illustration, it should be appreciated that such examples are merely illustrative and may be similarly applied to manned/unmanned vehicles and/or aerial/non-aerial vehicles. Additionally, any example herein that describes "flight paths" and/or "flight parameters" may similarly be applied to vehicles that do not fly. For example, a non-aerial vehicle may be travelling on a path, wherein operations of the vehicle may be indicated with "operation parameters" (e.g., speed, heading, vehicle type, etc.) Accordingly, an operational state of a non-aerial vehicle may be described using any suitable combination of such operation parameters.

Embodiments of the present disclosure are directed to, among other things, determining whether data available to an unmanned vehicle may be trusted. In particular, the unmanned vehicle may be configured to perform autonomous operations. An autonomous operation may represent an operation that may be performed by the unmanned vehicle independently and/or without control of an operator over the operation. To efficiently and properly perform an autonomous operation, trusted data may be needed. Trusted data may represent data that may be available to the unmanned vehicle from a particular source internal or external to the unmanned vehicle, reliable, not improperly altered, and/or generated by that particular source. Accordingly, the unmanned vehicle may rely on the trusted data to perform the autonomous operation. If the data may not be trusted, proper performance of the autonomous operation may be at risk. In certain situations, detecting whether the data may be trusted may become critical. Various techniques may be implemented to detect the trustworthiness of the data.

In one example technique, the data may be available from a particular source (e.g., an external source to the unmanned vehicle). Similar data (e.g., data of the same type or data facilitating the same autonomous operation) may be available from another source (e.g., an internal source of the unmanned vehicle). The two sets of data may be compared to determine if there may be a discrepancy. If a discrepancy exists and based on the discrepancy (e.g., an amount of the discrepancy relative to a threshold representing an acceptable discrepancy), the data from the particular source may be trusted. In another example technique, the data from the particular source may be analyzed absent the similar data of the other source. In particular, attributes of the data may be analyzed to determine whether the unmanned vehicle may be capable of performing the autonomous operation given the data. If not, the data may be untrusted. In yet another example technique, data from another unmanned vehicle may be used. For example, a web of trust may be established between the two unmanned vehicles. If the other unmanned vehicle indicates that its respective data available from the same particular source is untrusted, the data available to the unmanned vehicle may likewise be found to be untrusted.

To illustrate, consider an example of a UAV configured to deliver an item offered at an electronic marketplace. The UAV may use GPS data to, for instance, autonomously fly between two locations to complete a delivery. In certain situations, a ground source may spoof the GPS data. For example, incorrect GPS data may be transmitted from the ground source to the UAV. In this way, an entity associated with the ground station may temper with the autonomous flight, or even, highjack the UAV. To detect whether the GPS data is spoofed or not, any or a combination of the above techniques may be implemented. In one example, the UAV may compare the GPS data to navigation data (e.g., cardinal direction, altitude, acceleration, speed, etc.) generated by sensors of the UAV (e.g., electromagnetic compass, gyroscope, accelerometer, altimeter, barometric pressure sensor, and/or other inertial guidance sensors). If a discrepancy is detected beyond an acceptable value (e.g., the GPS data and the navigation data indicate two opposite cardinal directions, differing cardinal directions, etc.), the UAV may determine that the GPS data is spoofed. In another example, a camera of the UAV may capture an image of the location of the UAV. Image recognition techniques may be utilized to compare this image with a known image corresponding to the GPS data. If an unacceptable discrepancy between the two images is detected, the GPS data may be determined to be spoofed. In yet another example, the UAV may analyze the GPS data independently of other data. If the analysis demonstrates that the GPS data indicates an operation beyond the technical capability of the UAV (e.g., the GPS data indicates that the UAV flew at a speed exceeding its maximum speed), the GPS data may be determined to be spoofed. In a further example, a trust may exist between the UAV and a second UAV flying along the same or a proximate flight route. The second UAV may determine that its GPS data may be spoofed (e.g., by using any of the above techniques) and may report the spoofing via a peer-to-peer connection to the UAV. Based on the trust between the two UAVs and the flight proximity, the UAV may also determine that its GPS data may be spoofed.

In some embodiments, the signal strength of the GPS signal may be evaluated to determine whether the GPS data may be trusted. By way of example, signal strengths out of an expected power range (e.g., a predetermined power range corresponding to the GPS source such as a satellite or terrestrial GPS source) may be determined by the UAV (or another suitable system) to be untrusted. For example, when the GPS signal strength is determined to be over a threshold value (e.g., a maximum signal value), the UAV may deem the GPS data to be untrusted, regardless of other conditions that may exist at the time (e.g., environmental conditions, topography of an area within some distance of the UAV, a distance to a GPS satellite, etc.).

Additionally, or alternatively, the GPS data may be determined to be untrusted when environmental conditions in the UAV's general area indicate an expected signal strength that does not match the signal strength of the GPS data. By way of example, if the UAV is within an area experience heavy rainfall, the signal strength may be expected to be a weaker signal than in areas that are not experiencing heavy rainfall. Similarly, the GPS data may be determined to be untrusted when location conditions (e.g., topography, nearby obstructions, high population density, etc.) associated with a current location of the UAV indicate an expected signal strength that does not match the received signal strength of the GPS data. As a non-limiting example, when the UAV is navigating through a tunnel, or between large buildings, or through heavily populated areas, etc., the signal strength may be expected to be a weaker signal strength than signal strengths received in areas that do not contain such obstructions. In situations where environmental conditions or location conditions are expected to affect a received GPS signal strength, the UAV may be configured to determine that a change in the signal strength of received GPS data should indicate a stronger or weaker signal strength over time (e.g., a weaker signal strength followed by a stronger signal strength, or vice versa). If the change in the signal strength does not match the environmental/location conditions, the GPS data may be determined to be untrusted.

In some embodiments, the UAV (or another suitable system) may be configured to determine that the GPS data is untrusted based on a number of other signal-based conditions. For example, signal strength increases on one or more channels that indicate a difference (e.g., over a predetermined threshold value/percentage change) between a previous strength and a current strength may cause the UAV to determine that the GPS data should not be trusted. As another non-limiting example, signal strength modifications that do not match changing environmental conditions such as, but not limited to, a sudden down pour, driving through a tunnel, or navigating within an urban area with tall buildings may cause the UAV to deem the GPS signal strength to be untrusted. As a specific example, the UAV may determine that the received GPS signal strength indicates the data should not be trusted when the signal strength becomes suddenly 20% stronger than a signal strength of previously received GPS data. A sudden increase over multiple channels may additionally, or alternatively, cause the UAV to deem the GPS data untrusted.

In some cases, signal strength variations, when combined with other detectors for example, may cause the UAV (or another suitable system) to determine that the GPS data is untrusted. For example, if a discrepancy (e.g., over a threshold difference) exists between a heading indicated by the received GPS data and a heading indicated by an internal sensor of the UAV, when coupled with a signal strength variance may cause the UAV to deem the GPS data untrusted.

In some embodiments, the UAV may be configured to historical navigation data (e.g., learned route signal strengths) corresponding to previously traveled locations at which received signal strength values are recorded. The UAV may use the historical navigation data to compare an expected signal strength (e.g., a recorded signal strength) to the signal strength of the received GPS data. By way of example, the UAV may be dispatched to deliver an item. During the course of the delivery, the UAV (or another UAV) may record navigation data (e.g., GPS signal strengths) along the path traveled. During a subsequent delivery, the UAV may be traveling along the same path (or at least traveling over some portion of the same path). In some examples, the location of the UAV may be similar (e.g., within some threshold difference) to one or more locations along a previously-traveled path. By way of example, the UAV may be traveling along a same direction within a threshold distance of a previous path location, and/or the UAV may be traveling within similar environmental conditions as an environmental condition of a location of a previously-traveled path, etc. Accordingly, the UAV may compare the signal strength of the received GPS data to a previously-recorded signal strength. When the comparison indicates a significant discrepancy (e.g., a signal strength difference over a threshold amount), the UAV may determine that the GPS data should not be trusted. In a similar vein, historical navigation data (e.g., previously-recorded signal strengths corresponding to one or more previously-traveled routes) collected by other UAVs may be used to determine whether the current signal strength of the GPS data warrants trust.

In some embodiments, the determination that the signal strength of the GPS data received by the UAV may be determined to be untrusted by the UAV, another UAV, a central station, or any suitable system discussed herein. For example, signal strength monitoring may be provided as a service in which a system (e.g., the UAV, the central station, another UAV, etc.) may be configured to determine the received signal strength does not match an expected signal strength. This determination may be based on internal sensor data collected by the UAV (or another UAV), historical navigation data (e.g., previously received signal strengths recorded by the UAV or other UAVs), environmental conditions data, topographical data of the current location of the UAV, or the like. In some examples, once the GPS data is determined to be untrusted (e.g., spoofed) the system that detected the discrepancy (or any suitable system discussed herein) may provide a notification that the GPS data is untrusted. By way of example, the central station may determine that the GPS data is untrusted and notify the UAV of the same, the UAV may determine the GPS data is untrusted and notify the central station and/or other UAVs, etc.

Upon detection that data associated with an autonomous operation is untrusted, an unmanned vehicle may perform various corrective actions, some of which may be autonomously performed independently of the untrusted data. In an example, the unmanned vehicle may perform a certain maneuver independent of the untrusted data. In another example, the unmanned vehicle may report the untrusted data and/or the associated location to another unmanned vehicle. In yet another example, the unmanned vehicle may report the untrusted data to a central station and may enable remote control from the central station over operations of the unmanned vehicle. The central station may also collect reports of untrusted data and associated locations from different unmanned vehicles to generate a map. The map may enable deploying unmanned vehicles according to paths that may avoid hot spots corresponding to locations or areas of untrusted data. The map may also help with identifying and tracking such hot spots. These and other features and functionalities are described herein next.

In the interest of clarity of explanation, embodiments may be described herein in connection with determining whether GPS data available to a UAV may be spoofed. However, the embodiments are not limited as such. Instead, the embodiments may similarly apply to other navigation data, whether satellite or ground based, and/or to other type of data, whether available from a source internal or external to an unmanned vehicle. The embodiments are also not limited to UAVs and may similarly apply to other types of unmanned vehicles, whether aerial, ground, or water based. Generally, techniques described herein may be implemented to determine if data associated with an autonomous operation of an unmanned vehicle may be trusted and to perform a corrective action when such data may be untrusted.

Turning to FIG. 1, the figure illustrates an example environment where data may be available to an unmanned vehicle to perform an autonomous operation and where a determination may be made whether such data may be trusted or not. In particular, the figure illustrates a UAV 110 configured to deliver an item from a source 120 to a destination 130. At least a portion of the delivery may include an autonomous operation. For example, the UAV 110 may autonomously fly between the source 120 and the destination 130. Success of the autonomous navigation in this illustrative example may depend on GPS data. The UAV 110 may use the GPS data to fly (or, more generally, to navigate) between the source 120 and the destination 130.

Typically, the GPS data may be trusted if received from an appropriate source, such as a satellite system 140. However, the received GPS data may become untrusted under different scenarios. FIG. 1 illustrates one example scenario where the GPS data may be spoofed by a ground source 150. Other scenarios may also exist, but are not illustrated in FIG. 1. For example, the received GPS data may be reflected from, or even obstructed by, obstacles or buildings and as such may become less reliable. Regardless of the scenario, different techniques may be implemented to determine whether the received GPS data may be trusted and to take one or more corrective actions when the received GPS data may be determined to be untrusted.

In an example, the source 120 may represent a fulfillment center (F.C.) associated with an electronic marketplace. The fulfillment center may include a warehouse, a storage facility, or some other source from which the item may be available. Generally, the electronic marketplace may offer and facilitate purchases and deliveries of the item (or units thereof) from the source 120. A set of computing resources or system, such as servers 122, may be configured to facilitate the electronic marketplace. For example, the servers 122 may host an electronic platform for the electronic marketplace. The electronic platform may include a front end system, such as a web site of the electronic marketplace, to offer the item and different delivery methods. A consumer may use a computing device to interact with the front end system to purchase the item and select a delivery method. The consumer may also provide information, such as location information, about the destination 130. The destination 130 may represent an area or location to which the item should be delivered. The electronic platform may also include a back end system to process orders of the item. For example, the back end system may manage or control the handling of the item in the source 120 and the deployment of the UAV 110 with the item in response to a consumer purchase of the item and a selection of a delivery method. As such, the UAV 110 may receive location data and/or a navigation route related to the source 120 and destination 130 from the servers 122.

Figure 3:
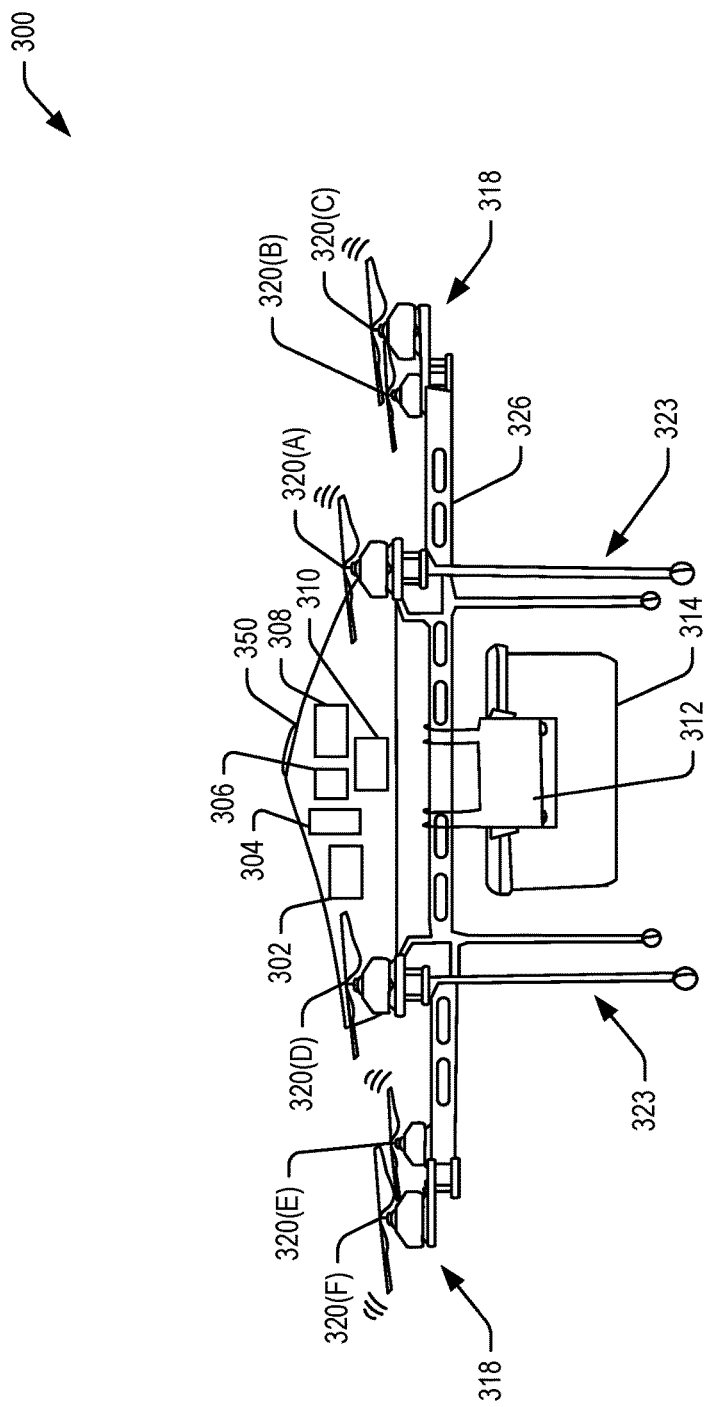
FIG. 3 illustrates an example unmanned vehicle configuration, according to embodiments.

The UAV 110 may be deployed from the source 120 to the destination 130 to deliver the item. In an example, the UAV 110 may autonomously navigate between the source 120 and the destination 130. The navigation may include moving, such as flying in the case of the UAV 110 (or other type of operations for other types of unmanned vehicles), between the two locations. To autonomously navigate, the UAV 110 may rely on navigation data. Navigation data may represent data usable by the UAV 110 to autonomously navigate. FIG. 1 illustrates GPS data as an example of navigation data available from a source external to the UAV 110. However, other types of navigation data may exist and are not illustrated in FIG. 1. For example, a terrestrial wireless network (e.g., cellular, Wi-Fi, or other wireless-based network) may provide navigation data to the UAV 110. In another example, the UAV 110 may also use navigation data available from sensors of the UAV 110. Example of such sensors are illustrated in FIG. 3.

In the illustrative example of FIG. 1, the UAV 110 may autonomously fly between the source 120 to the destination 130 using GPS data. The satellite system 140 may cover the flight route and provide the GPS data. The UAV 110 may receive the GPS data at various radio signal strengths and time signals from the satellite system 140. However, and unknown to the UAV 110 (and to the servers 122), somewhere along the flight route, the ground source 150 may spoof the GPS data. The spoofing may include sending different (or spoofed) GPS data at stronger radio signal strengths, but with the same time signals. The UAV 110 may receive the spoofed GPS data from the ground source 150. Because of the stronger radio signal strengths, the UAV 110 may use the spoofed GPS data instead of the proper (or trusted) GPS data of the satellite system 140. In this way, the ground source 150 may send incorrect navigation data (e.g., spoofed GPS coordinates) to alter, or even direct, the flight route of the UAV 110.

For example, the ground source 150 may cause the UAV 110 to fly to a location other than the destination 130 or to return to a location other than the source 120. Because of the autonomous navigation, the UAV 110 may not determine that the received GPS data may be spoofed and, thus, may not take a corrective action unless techniques for detecting GPS data spoofing may be implemented. Absent these techniques, the UAV 110 may trust the received GPS data, even when spoofed, and may accordingly end up autonomously navigating incorrectly to an undesired location.

In an example technique, the UAV 110 may access navigation data local to the UAV 110, such as navigation data available from a source internal to the UAV 110. For instance and as further illustrated in FIG. 3, the UAV 110 may include one or more navigation sensors and a computer system. The navigation sensors may include inertial guidance sensors and other sensors to sense and provide different flight parameters (or more generally navigation parameters) to the computer system. The flight parameters may include one or more of altitude, heading, cardinal direction, acceleration, speed, pitch, yaw, or roll of the UAV 110 at different times or throughout the flight route. In turn, the computer system may generate a state of the navigation based on this data. The state may represent a collection of the data and/or of results of processing the data originating locally from the UAV 110. The computer system may analyze the navigation data of the state. If a direct discrepancy at any point (e.g., an instantaneous conflict) is detected between the navigation data and the GPS data (e.g., opposite cardinal directions, different altitudes), the GPS data may be determined to be spoofed. Similarly, if a discrepancy over time is detected (e.g., a state conflict where the GPS data and the navigation data show different or diverging flight paths over time), the GPS data may be determined to be spoofed. An example of this sensor-based technique is further illustrated in FIG. 6.

In another example technique, the UAV 110 may be additionally or alternatively equipped with one or more optical sensors forming one or more imaging devices (e.g., cameras). Images of the flight (e.g., of locations underneath the UAV 110) may be captured at different resolutions. Known images corresponding to the GPS data may be also accessed. Based on various image-processing techniques, the captured and accessed images may be compared. If unacceptable discrepancies are detected, the GPS data may be determined to be spoofed. This image-based technique may be implemented in different ways. For example, the images may be captured at various time intervals (e.g., every five minutes). In another example, the images may be captured based on the GPS data. For instance, an image may be captured once the UAV 110 receives a particular GPS coordinate. In yet another example, the images may be continuously captured. In this case, the images may represent a video stream. An example of this image-based technique is further illustrated in FIG. 7.

In yet another technique, the UAV 110 may not rely on data other than the GPS data to detect the spoofing. Under this technique, the computer system may generate a similar flight state (or navigation state) using the received data and compare the navigation data from the flight state to capabilities of the UAV 110. If the comparison indicates that the UAV 110 would have performed an operation unsupported by the UAV 110 (e.g., unsupported by at least one of the capabilities), the GPS data may be determined to be spoofed. Different types of discrepancies may exist and may indicate that the GPS data may be spoofed. In an example, the discrepancy may be direct or instantaneous (e.g., a sudden change in the GPS data indicating that the UAV 110 instantaneously flew a distance beyond what may be possible). In another example, the discrepancy may be over time (e.g., the GPS data more subtly change, but may indicate that UAV 110 flew a distance for a time period beyond what may be possible for that time period). In yet another example, the discrepancy may relate to a pre-stored flight route. For instance, the UAV 110 may have received and stored a flight route from the servers 122. If the flight state indicates an unacceptable deviation from that route, the GPS data may be spoofed. An example of this GPS data-based technique is further illustrated in FIG. 8.

In a further technique, the UAV 110 may rely on reports of GPS spoofing from other UAVs. For example, a trust may exist between the UAV 110 and a second UAV flying along the same or a similar (e.g., proximate) flight route. If the second UAV generates and transmits an indication that spoofing may be occurring at a particular location or area, the UAV 110 may use this indication to determine that its GPS data may be spoofed once arriving to or flying in proximity of the particular location or area. An example of this trust-based technique is further illustrated in FIG. 9.

In another technique, the UAV 110 may determine the GPS data is spoofed based on the signal strength of the received GPS data. For example, the UAV 110 may be equipped to determine that the received signal strength if out of an expected power range (e.g., a predetermined power range corresponding a satellite or ground-based source). The UAV 110 may determine that the GPS data is spoofed based on the signal strength falling outside the expected range alone, or in combination with other conditions discussed herein (e.g., estimated location, navigational data comparisons between the GPS data and flight parameters calculated by the UAV 110, etc.). For example, when the GPS signal strength is determined to be over a threshold value (e.g., a maximum signal value), the UAV 110 may deem the GPS data to be untrusted, regardless of other conditions that may exist at the time (e.g., environmental conditions, topography of an area within some distance of the UAV 110, a distance to a GPS satellite, etc.).

In other examples, the UAV 110 may determine that an increase in signal strength is over a threshold amount and/or that the increase (or the amount of increase) indicates a discrepancy between the received GPS data and an expected signal strength. The expected signal strength may be obtained/generated utilizing any suitable information. By way of example, topographical information (e.g., topographical maps, land-based elevation values corresponding to many locations, mapping of populated areas indicating building heights and/or landmarks, etc.) may be utilized to determine whether a topography of the area is likely to affect signal strengths of received GPS data. In another example, environmental data (e.g., weather reports) or other suitable data indicating a current environmental condition (e.g., heavy rainfall, hurricane, lighting storm, etc.) may be utilized to determine whether the environmental conditions of the current location of the UAV are likely to affect signal strengths of received GPS data. In still another example, historical navigation data (e.g., previously recorded signal strength values corresponding to various locations) may be utilized to determine past-experienced signal strengths given a particular location (e.g., the location of the UAV 110). Regardless of the type or source, conditions data (e.g., any suitable combination of the topographical information, environmental data, historical navigation data, etc.) may be utilized to calculate/determine an expected signal strength of GPS data within some distance (e.g., one mile, five kilometers, at the exact location of the UAV 110, etc.) of the current location of the UAV 110 as indicated by the GPS data.

According to some techniques, the UAV 110 may be configured to determine that the GPS data is untrusted based on a number of other signal-based conditions. For example, signal strength increases on one or more channels that indicate a difference (e.g., over a predetermined threshold value/percentage change) between a previous strength and a current strength may cause the UAV 110 to determine that the GPS data should not be trusted. As a specific example, the UAV may determine that the received GPS signal strength indicates the data should not be trusted when the signal strength becomes suddenly 5% stronger than a signal strength of previously received GPS data. A sudden increase over multiple channels may additionally, or alternatively, cause the UAV 110 to deem the GPS data untrusted.

In some cases, signal strength variations, when combined with other detectors for example, may cause the UAV to determine that the GPS data is untrusted. For example, the GPS data may indicate the UAV 110 is headed in direction A, while sensor data collected by one or more sensors the UAV 110 indicates that the UAV 110 is headed in direction B. In cases in which direction A does not equal direction B, or direction A differs from direction B over a particular amount (e.g., over two degrees, over one radian, etc.), the UAV 110 may determine that the GPS data is spoofed.

Regardless of the technique implemented to detect the spoofing, the UAV 110 may autonomously perform various corrective actions once spoofing is detected. FIG. 1 illustrates an example corrective action where the UAV 110 may autonomously fly for at least a portion of the flight independently without using the GPS data. In particular, FIG. 1 illustrates three flight phases: a first GPS flight phase 160, followed by a non-GPS flight phase 162, subsequently followed by a second GPS flight phase 164. As illustrated, the UAV 110 may fly throughout the first GPS flight phase 160 using the received GPS data. At some point in time (e.g., near the end of the first GPS flight phase 160), the UAV 110 may determine that the received GPS data may be spoofed. Accordingly, the UAV 110 may stop using the GPS data for its autonomous flight, which may result in the start of the non-GPS flight phase 162. In this phase, the UAV 110 may use locally generated navigation data, such as data generated from its navigation sensors. In parallel or at various time intervals, the UAV 110 may monitor the received GPS data to determine if the GPS data may be trusted again (e.g., the spoofing no longer exists). If so, the UAV 110 may revert back to using the GPS data, now trusted, which may result in the end of the non-GPS flight phase 162 and the beginning of the second GPS flight phase 164.

Other corrective actions may also be performed. Generally, the corrective actions may be grouped into different categories. One category may include corrective actions to confirm the spoofing. Another category may include corrective actions to avoid using spoofed GPS data. Yet another category may include reporting information about the spoofing. Each of these categories is described herein next.

To confirm the spoofing, the UAV 110 may in an example use a combination of the spoofing detection techniques. For instance, if the spoofing is detected by using the image-based technique, the UAV 110 may use the sensor-based technique to confirm the spoofing. Similarly, if the spoofing is detected using a signal-based-technique, an image based technique and/or a sensor-based technique may be employed to confirm the spoofing. In yet another example, the UAV 110 may perform an autonomous operation to confirm the spoofing. For example, the UAV 110 may maintain its position (e.g., enter a holding pattern where the UAV 110 remains at one geographical location). The UAV 110 may then monitor whether and/or how the received GPS data may be changing. If the GPS data changes despite the fact that the position may be maintained, the spoofing may be confirmed.

To avoid using the spoofed GPS data, the UAV 110 may, for example, rely on the locally generated navigation data as illustrated in FIG. 1. In this example, the UAV 110 may continue its autonomous flight to the destination 130, or back to the source 120, by using the locally generated navigation data. Alternatively, the UAV 110 may fly to a safe area (e.g., to an administered, monitored, or known area where spoofing may not exist). In yet another example, the UAV 110 may change its position (e.g., gain altitude) continuously or at increments and, in parallel, monitor whether the spoofing may no longer be detected. In such a case, the UAV 110 may revert back to using received GPS data, which would be trusted. However, if the spoofing is detected after a number of attempts (or after a timer expiration), the UAV 110 may abort the delivery and use the navigation sensors to fly back to the source 120, the safe area, or park (e.g., graciously land on a proper surface).

In a further example, the UAV 110 may indicate to a central station that spoofing may have been detected and may enable remote control of the autonomous operation (e.g., the flight) from the central station. For instance, the computer system of the UAV 110 may establish a connection over a wireless network with the central station, request the remote control, process received controls and commands from the central station, and direct components of the UAV 110 according to these controls and commands. The central station may be a component of the backend system of the electronic marketplace, may be hosted on the servers 122, and may be configured to monitor and manage the deployment of UAVs and certain aspects of UAV operations.

Additionally or alternatively to the above corrective actions, the UAV 110 may also report information about the spoofing to different entities over a wireless network. The information may be reported to other UAVs, such as UAVs in proximate locations. The information may also be reported to the central station. The reported information may include an indication of the spoofing, such as a message or a flag describing that spoofing may have been detected. The reported information may also include the spoofed GPS data, image data, flight state, and/or a proximate location of the spoofing determined based on, for instance, the locally generated navigation data of the UAV 110.

Hence, the UAV 110 may autonomously navigate between the source 120 and the destination 130 using GPS data. However, if the GPS data is no longer trusted at some point in time, the UAV 110 may autonomously perform a corrective action that may be related to the autonomous navigation and that may not depend on using the spoofed GPS data. By doing so, protection against GPS data spoofing may be achieved.

A combination of the different detection techniques and the different corrective actions may be implemented based on different factors. The factors may relate to contexts associated with the UAVs, the central station, and/or the item to deliver. For example, a UAV may include certain, but not all type of sensors (e.g., navigation but not optical sensors). As such, the UAV may implement certain, but not all detection techniques (e.g., sensor-based but not image-based techniques). In another example, a computer system of a UAV may have sufficient processing power to support particular detection techniques and corrective actions. In addition, other contexts may limit what technique may be used. For instance, a network connectivity may not exist to a central station or to another UAV, or if existent, the network bandwidth may be limited. As such, the UAV may not use the trust-based technique or transmit images to the central station.

In another illustration, the power level of the UAV may be running low. However, certain detection techniques, such as the image-based technique, may use a large amount of computation and accordingly consume a large amount of power. To reduce the power consumption, the UAV may not use such detection techniques. Instead, the UAV may use another detection technique (e.g., a signal-strength-based technique) or may provide data to the central station such that the central station may implement the detection technique and provide the spoofing detection result back to the UAV.

In yet another example, if the item is of a certain value (e.g., a high monetary value, a high urgency value, etc.), a combination of the various detection techniques may be used to not only detect, but to also confirm the spoofing. In this example, the corrective action may be tailored to the value. The higher the value may be, the more secure or aggressive the corrective action may be to deliver the item independently of the spoofed GPS data. For instance, for a high value item, the corrective actions may include using locally generated sensor data to continue an autonomous flight for a relatively longer period of time towards a delivery destination. However, if the spoofing detection persists for the entire period of time, the corrective action may further include flying to a safe area and reporting the spoofing and an identifier of the item to the central station.

Figure 2:
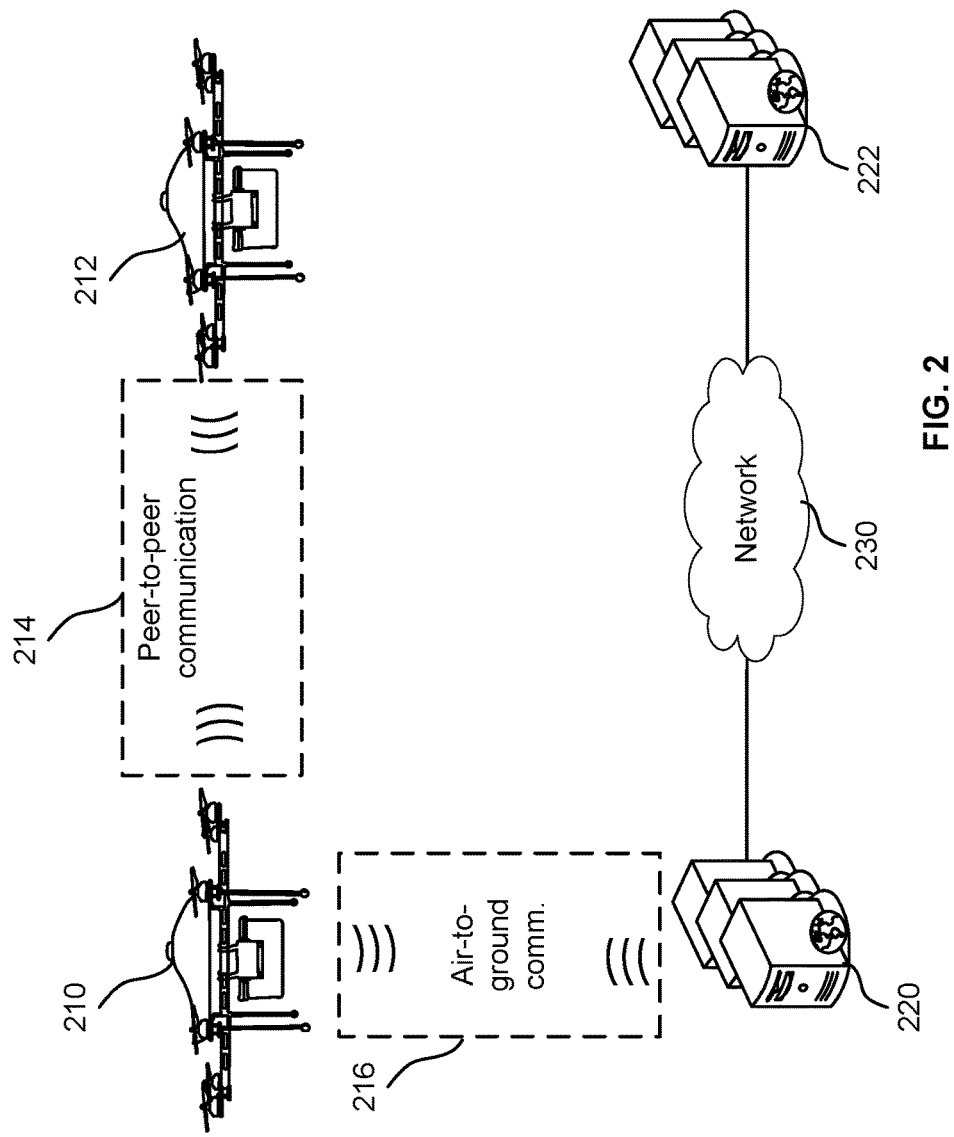
FIG. 2 illustrates an example environment for autonomous operations of multiple unmanned vehicles, according to embodiments.

These various examples are provided for illustrative purposes. Other combinations of detection techniques and corrective actions may be used based on contexts associated with the UAVs, the central station, and/or the item to deliver. FIG. 2 illustrates an example environment that may involve using some of these contexts.

In particular, a UAV 210 may be in communication with a second UAV 212 and a central station 220. Different types of communication may exist between these components. Generally, the communication may be carried over a wireless network. Peer-to-peer communication 214 over a short range wireless network may be established between the UAV 210 and the second UAV 212. For example, point-to-point Wi-Fi, Bluetooth, or other technologies may be used. In comparison, an air to ground communication 216 using a broadcast, multicast, or unicast protocol over, for instance, a Wi-Fi, WiMax, or cellular network may be established between the UAV 210 and the central station 220. Regardless of the used network technology, a network of trust may be established between the UAVs, and/or between the UAV 210 (or both UAVs) and the central station 220. The network of trust may use tokens (e.g., shared secrets) for authentication. For example, the UAV 210 may receive a token from the UAV 212 with an identity (e.g., a unique identifier) of the UAV 212. The UAV 210 may authenticate the identity of the UAV 212 based on the token. Similarly, the central station 220 may authenticate the UAV 210. This authentication may allow the various components to establish a trust such that data exchanged between these components may be trusted.

Based on the network of trust, the different components may exchange data about detected GPS spoofing. For example, information about spoofing may be transmitted from the UAV 210 to the second UAV 212, or vice versa, over the peer-to-peer communication 214. The information may also be transmitted from the UAV 210 (or the second UAV 212) to the central station 220, or vice versa, over the air-to-ground communication 216.

In some embodiments, the UAV 210 and the UAV 212 may exchange navigation data and/or any suitable data indicative of signal strength over the peer-to-peer communication 214. For example, UAV 210 may transmit navigation data (e.g., previously-stored historical navigation data including various historical signal strengths, a current location of UAV 210, a previously-received signal strength corresponding to GPS data previously received by the UAV 210, topographical data such as natural and/or urban landmarks detected by the UAV 210, environmental data (e.g., a weather report, sensor data of an environmental sensor attached to and/or operated by the UAV 210, etc.). or any suitable data for providing an expected signal strength from the UAV 210 to the UAV 212. UAV 212 may be configured to transmit any suitable combination of the data provided above to the UAV 210.

Further, and as illustrated in FIG. 2, a second central station 222 may exist. In an example, the UAV 210 and the central station 220 may be associated with (e.g., managed, controlled, or operated by) a same service provider. In comparison, the second UAV 212 and the second central station 222 may be associated with a different service provider. In other words, information about spoofing may be exchanged between different service providers. A network 230 may exist between the two central stations to facilitate the information exchange. This network 230 may be public (e.g., may use the Internet) or private (e.g., may use an intranet or a virtual private network (VPN) over a public network).

In addition to facilitating the exchange of spoofing-related information, the network of trust may distribute the spoofing detection between the various components. For example, the UAV 210 may locally detect spoofing. By reporting the spoofing to the second UAV 212, the second UAV 212 may avoid locally using a detection technique and may rely on the reported information instead. In another example, the UAV 210 may not be capable of implementing a particular detection technique, or even if capable, may nonetheless rely on the central station 220. In this example, the UAV 210 may provide data to the central station 220 (e.g., image data, signal strengths of received GPS data, etc.). In turn, the central station 220 may process the data on behalf of the UAV 210 to detect whether spoofing may exist (e.g., by using different image processing techniques, by comparing a received signal strength to an expected signal strength) and may report the result back to the UAV 210.

In yet another example, the central station 220 may collect information about detected spoofing from various sources (e.g., the two UAVs 210 and 212 and the second central station 222) to generate a map of the spoofing. The map may correlate detected spoofing to geographical locations (or areas). The map may also include a time dimension that may reflect the timeliness (e.g., how fresh or stale) and evolution over time of the spoofing. Further, the central station 220 may identify a source of the spoofing (e.g., the ground source 150) based on the information collected from the different sources. For instance, the UAV 210 may provide an image of a ground location and/or GPS data (or at least a signal strength value corresponding to the received GPS data) to the central station 220 with an indication that spoofing may have been detected. The central station 220 may request a second image of the same location from the second UAV 212. If the second UAV 212 provides the second image with an indication that no spoofing was detected at that location, the central station 220 may compare the two images. An object detected in one, but not in the other image, may be identified as the potential source of spoofing. This process may be iteratively repeated over multiple images from multiple UAVs and associated indications of spoofing or lack thereof to identify the source with a high likelihood. As another example, the central station 220 may request signal strength value(s) corresponding to the second UAV 212. If the signal strength of the UAV 212 indicates a discrepancy (e.g., over a predetermined threshold difference) from the received GPS data of the UAV 210, then the central station 220 may determine that the GPS data has been spoofed and may provide the indication to the UAV 210. Upon receipt of information from the central station 220 indicating that the GPS data has been spoofed, the UAV 210 may be configured to perform one or more of the corrective actions discussed herein.

Furthermore, the network of trust may facilitate the exchange of information about corrective actions. For example, the UAV 210 may report that a particular corrective action successfully (or unsuccessfully) avoided the spoofing at a particular location. Accordingly, the second UAV 212 may use that particular corrective action (or may avoid it if unsuccessful) at the particular location. Similarly, the central station 220 may correlate the corrective actions and the associated successes to the mapped geographical locations of the spoofing. As such, the central station 220 may instruct UAVs about what corrective actions should be performed at different locations. Additionally, or alternatively, the central station 220 may generate flight routes that may avoid particular geographical locations associated with spoofing or that may include particular corrective actions at those geographical locations. Such flight routes may be provided to the UAVs as part of deploying the UAVs.

Hence, the network of trust may facilitate UAVs and central stations to exchange information about detected spoofing and successful corrective actions. In addition, based on various contexts (e.g., available network bandwidth, available computational resources of a UAV, available power of a UAV, etc.) the computation processing for spoofing detection may be alleviated by distributing this processing across the UAVs and/or the central stations.

To detect spoofing and/or to perform a corrective action, a UAV may rely on a combination of a computer system, navigation sensors, optical sensors, and network interfaces. FIG. 3 illustrates an example configuration of a UAV 300 with such components. In particular, the UAV 300 may be configured to deliver an item. The UAV 300 may perform an autonomous operation associated with the delivery. For example, the autonomous operation may include an autonomous flight from a source storing the item to a destination receiving the item.

The UAV 300 may be designed in accordance with commercial aviation standards and may include multiple redundancies to ensure reliability. In particular, the UAV 300 may include a plurality of systems or subsystems operating under the control of, or at least partly under the control of, a management system 302. The management system 302 may include an onboard computer system hosting a management module for autonomously or semi-autonomously controlling and managing various operations of the UAV 300 and, in some examples, for enabling remote control from a central station. The various operations may include managing other components of the UAV 300, such as a propulsion system 318 to facilitate flights. Portions of the management system 302, including the onboard computer system, may be housed under a top cover 350. The top cover 350 may also include a power supply and assemblies (e.g., rechargeable battery, liquid fuel, and other power supplies) (not shown) to facilitate operation of the UAV 300.

In addition, the UAV 300 may include a number of navigation devices, sensors, antennas, communication links, and other systems to aid in navigating the UAV 300. Such components may also be housed under the top cover 350. In an example, a GPS receiver 304 may be installed. GPS data received by the GPS receiver 304 from a source external to the UAV 300 may be sent over a data bus to the management system 302. In turn, the management system 302 may direct various components to accordingly perform autonomous operations of the UAV 300 including, for example, an autonomous flight. In an example, the management system 302 may also store the GPS data and, accordingly, generate a flight state. Further, additional navigation sensors 306 may be installed under the top cover 350. The navigation sensors 306 may include, by way of example, an electromagnetic compass, a gyroscope, an accelerometer, an altimeter, a barometric pressure sensor, and/or other navigational components (e.g., components related to an inertial navigation system (INS), a range finder, and/or Radio Detection And Ranging (RADAR)). Sensor data (e.g., navigation-related data generated by such sensors 306) may be sent to the management system 302 over a same or different data bus. Similarly to processing the GPS data, the management system 302 may process this locally generated sensor data to generate a flight state and/or to direct the autonomous operations of other components.

Optical sensors 308 may also be installed under the top cover 350. In an example, one or more optical sensors may be components of an imaging device (e.g., a camera) attached to or integrated with the UAV 300. The imaging device may be tilted in different directions to capture images of, for example, a surface under, on the side, or over the UAV 300. If the imaging device is statically affixed and cannot be tilted, the management system 302 may orient the UAV 300 to capture images of these different directions. Captured images may be of different resolution or of different types. For example, the management system 302 may request a particular image resolution or an infrared image. The imaging device may accordingly generate such image by activating the proper optical sensors and send the image (e.g., the resulting image data) to the management system 302.

Further, a network interface 310 may be installed under the top cover 350. The network interface may include, for example, a wireless network card or wireless network port that may facilitate communication between the UAV 300 (e.g., the management system 302) and one or more external resources (e.g., central stations, other UAVs, etc.) over a network. The network interface 310 may accordingly enable one or more wireless communications links and antennas (e.g., modem, radio, network, cellular, satellite, and other links for receiving and/or transmitting information) from and to these external resources. As such, the interface 310 may include high-speed interfaces, wired and/or wireless, serial and/or parallel, to enable fast upload and download of data to and from the computer system 304. In an example, the network interface 310 may include 802.11 interfaces, 802.16 interfaces, Bluetooth interfaces, near field communication interfaces, cellular interfaces, and/or satellite interfaces for download and upload of data.

As shown in FIG. 3, the UAV 300 may also include a retaining system 312. The retaining system 312 may be configured to retain payload 314. In some examples, the retaining system 312 may retain the payload 314 using friction, vacuum suction, opposing arms, magnets, and other retaining methods. As illustrated in FIG. 3, the retaining system 312 may include two opposing arms (only one is illustrated) configured to retain the payload 314. In an example, the payload 314 may include an item ordered from an electronic marketplace. The management system 302 may be configured to control at least a portion of the retaining system 312. In some examples, the retaining system 312 may be configured to release the payload 314 in one of a variety of ways. For example, the retaining system 312 (or other system of the UAV 300) may be configured to release the payload 314 with a winch and spool system, by the retaining system 312 releasing the payload, by fully landing on the ground and releasing the retaining system 312, and other methods of releasing the payload 314. In some examples, the retaining system 312 may operate semi-autonomously or autonomously.

Further, the UAV 300 may include a propulsion system 318. In some examples, the propulsion system 318 may include rotary blades or otherwise be a propeller-based system. As illustrated in FIG. 3, the propulsion system 318 may include a plurality of propulsion devices, a few of which, 320(A)-320(F), are shown in this view. Each propeller device may include one propeller, a motor, wiring, a balance system, a control mechanism, and other features to enable flight. In some examples, the propulsion system 318 may operate at least partially under the control of the management system 302. In some examples, the propulsion system 318 may be configured to adjust itself without receiving instructions from the management system 302. Thus, the propulsion system 318 may operate semi-autonomously or autonomously.

The UAV 300 may also include landing structure 323. The landing structure 323 may be adequately rigid to support the UAV 300 and the payload 314. The landing structure 323 may include a plurality of elongated legs that may enable the UAV 300 to land on and take off from a variety of different surfaces. The plurality of systems, subsystems, and structures of the UAV 300 may be connected via frame 326. The frame 326 may be constructed of a rigid material and be capable of receiving via different connections the variety of systems, sub-systems, and structures. For example, the landing structure 323 may be disposed below the frame 326 and, in some examples, may be formed from the same material and/or same piece of material as the frame 326. The propulsion system 318 may be disposed radially around a perimeter of the frame 326 or otherwise distributed around the frame 326. In some examples, the frame 326 may attach or be associated with one or more fixed wings.

Figure 4:
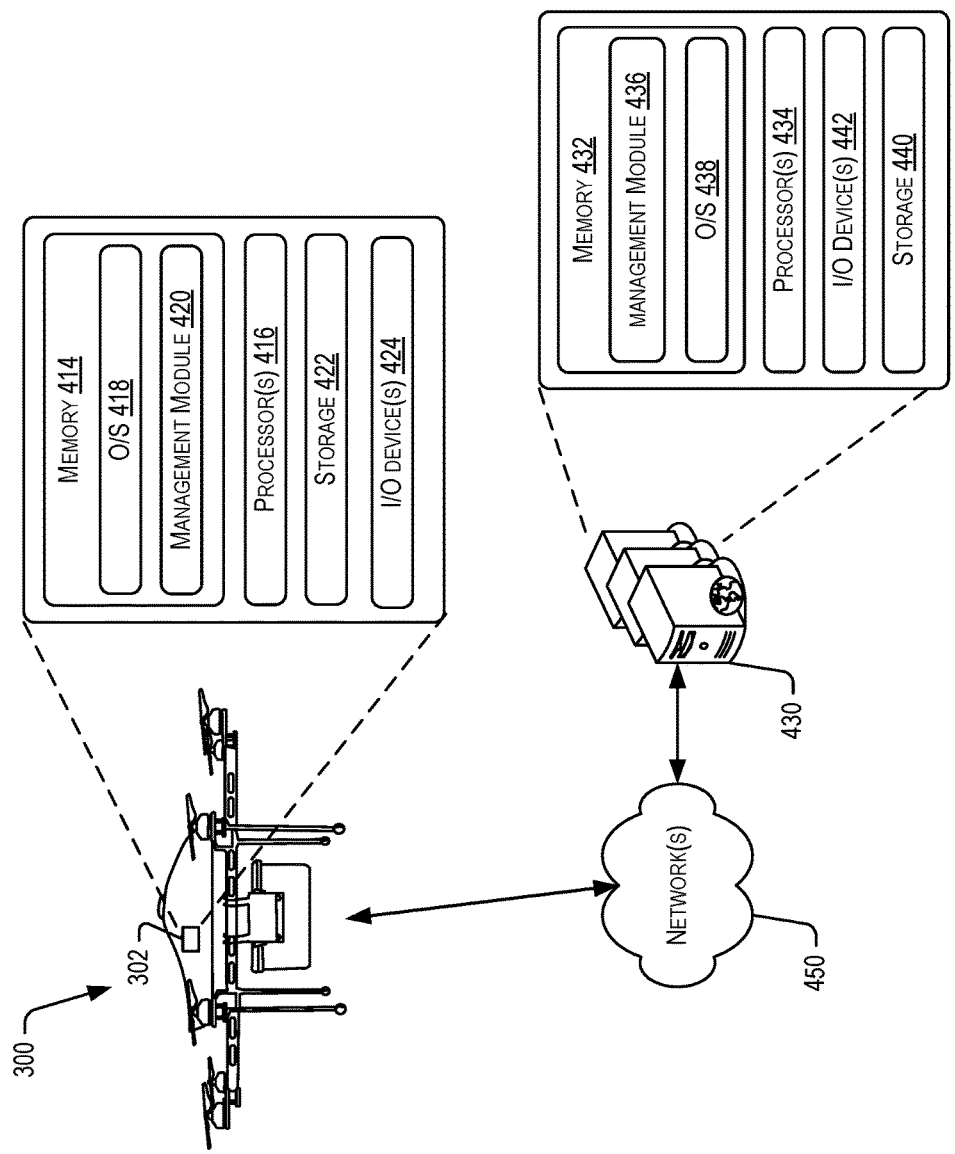
FIG. 4 illustrates an example computing architecture that may include an unmanned vehicle and a remote computing resource, according to embodiments.

A network of trust may exist between the UAV 300 and a central station and may be used to distribute processing and exchange information between such components. FIG. 4 illustrates an example of such a configuration where the UAV 300 may be in communication with a central station 430 over a network 450.

In an example, the central station 430 may be in communication with the UAV 300 to facilitate a delivery of an item ordered from the electronic marketplace. This communication may occur over the network 450. The network 450 may include any one or a combination of many different types of networks, such as wireless networks, cable networks, cellular networks, satellite networks, radio networks, the Internet, and other private and/or public networks. Facilitating the delivery may include selecting the UAV 300 for deployment, providing flight route information as part of the deployment, deploying the UAV 300, monitoring the flight of the UAV 300, exchanging information about detected GPS spoofing and potential corrective actions, and/or providing remote controls over certain operations of the UAV 300 as needed.

Turning now to the details of the central station 430, the central station 430 may include or may be hosted on one or more service provider computer systems, such as servers and other suitable computing devices, configured to offer various services to users. Such computer systems may be configured to host a web site (or combination of web sites) accessible to customers. The web site may be accessible via a web browser and may enable a consumer to place an order for an item.

In embodiments, the central station 430 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the central station 430 may be hosted on one or more servers, perhaps arranged in a cluster, or as individual servers not associated with one another.

In one illustrative configuration, the central station 430 (or the hosting computer system) may include at least one memory 432 and one or more processing units (or processor(s)) 434. The processor(s) 434 may be implemented as appropriate in hardware, computer-executable instructions, software, firmware, or combinations thereof. Computer-executable instruction, software, or firmware implementations of the processor(s) 434 may include computer-executable or machine-executable instructions written in any suitable programming language to perform the various functions described. The memory 432 may include more than one memory and may be distributed throughout a plurality of a network of servers. The memory 432 may store program instructions (e.g., a management module 436) that are loadable and executable on the processor(s) 434, as well as data generated during the execution of these programs. Depending on the configuration and type of memory, the memory 432 may be volatile (such as random access memory (RAM)) and/or non-volatile (such as read-only memory (ROM), flash memory, or other memory).

The central station 430 (or the hosting computer system) may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 432 may include multiple different types of memory, such as static random access memory (SRAM), dynamic random access memory (DRAM), or ROM.

Turning to the contents of the memory 432 in more detail, the memory 432 may include an operating system 438 and one or more application programs, modules or services for implementing the features disclosed herein including at least the management module 436. The management module 436, in some examples, may support, direct, manage, and/or control operations of some or all of the components of the UAV 300. For instance, the management module 436 may transmit data associated with a delivery of an item to the UAV 300. Such data may include flight route information (e.g., source location, destination location, flight path, checkpoints along the path, etc.) and may be used by the UAV 300, such as by the management system 302 thereat, to deliver the item. Furthermore, the management module 436 may be used to select and deploy the UAV 300 on a delivery mission. The management module 436 may also receive data from the UAV 300 during the deployment and/or execution of the delivery mission. The management module 436 may process that data and provide, as applicable, further instructions to the UAV 300 to adjust the flight route, perform a corrective action, and/or adjust the delivery of the item.

In some examples, the central station 430 (or the hosting computer system) may also include additional storage 440, which may include removable storage and/or non-removable storage. The additional storage 440 may include, but is not limited to, magnetic storage, optical disks, and/or tape storage. The disk drives and their associated computer-readable media may provide non-volatile storage of computer-readable instructions, data structures, program modules, and other data for the computing devices.

The memory 432 and the additional storage 440, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computer systems (e.g., processors). The modules of the central station 430 may include one or more components. The central station 430 may also include I/O device(s) and/or ports 442, such as for enabling connection with a keyboard, a mouse, a pen, a voice input device, a touch input device, a display, speakers, a printer, or other I/O device.

FIG. 4 further illustrates components of the management system 302 of the UAV 300. The management system 302 may include a management component implemented, in part or in full, by the computer system. The computer system may include at least one memory 414 and one or more processing units (or processor(s)) 416. The processor(s) 416 may be implemented as appropriate in hardware, computer-executable instructions, software, firmware, or combinations thereof. Computer-executable instruction, software, or firmware implementations of the processor(s) 416 may include computer-executable or machine-executable instructions written in any suitable programming language to perform the various functions described. The memory 414 may include more than one memory and may be distributed throughout the computer system 402. The memory 414 may store program instructions (e.g., a management module 420) that are loadable and executable on the processor(s) 416, as well as data generated during the execution of these programs. Depending on the configuration and type of memory, the memory 414 may be volatile (such as random access memory (RAM)) and/or non-volatile (such as read-only memory (ROM), flash memory, or other memory).

The computer system may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM.

In some examples, the computer system may also include additional storage 422, which may include removable storage and/or non-removable storage. The additional storage 422 may include, but is not limited to, magnetic storage, optical disks, and/or tape storage. The disk drives and their associated computer-readable media may provide non-volatile storage of computer-readable instructions, data structures, program modules, and other data for the computing devices.

The memory 414 and the additional storage 422, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computer system may include one or more components.

Turning to the contents of the memory 414 in more detail, the memory 414 may include an operating system 418 and one or more application programs, modules or services for implementing the features disclosed herein including at least the management module 420. The management module 420 may be configured to provide vehicle operation management functions and/or to manage operations of different components to deliver an item. In an example, the management module 420 may operate autonomously or independently of the management module 436 of the central station 430. In another example, the management module 420 may operate semi-autonomously or be fully controlled by the management module 436.

The computer system may also include I/O device(s) 426 (e.g., interfaces, ports) such as for enabling connection with the central station 430. The I/O device(s) 426 may also enable communication with the other components and systems of the UAV 300 (e.g., a propulsion system, GPS receiver, navigation sensors, imaging sensors, etc.).

Figure 5:
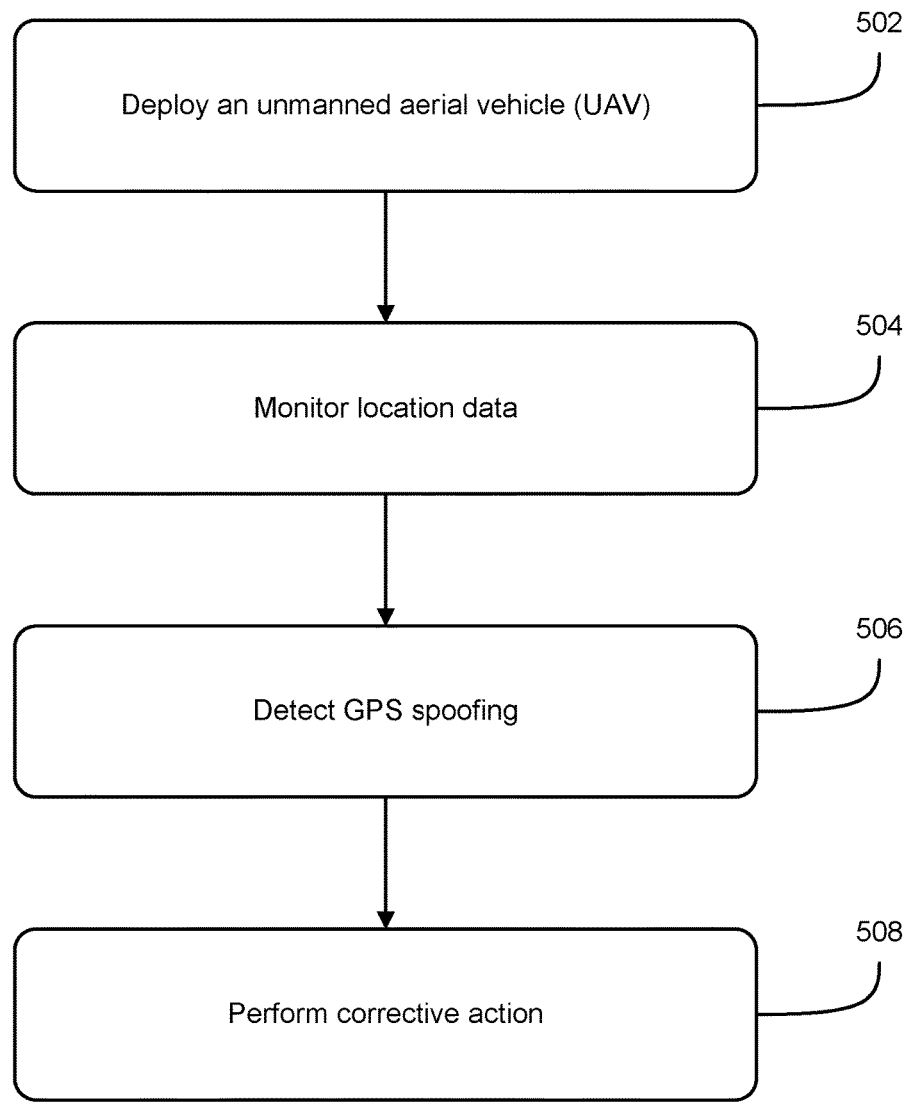
FIG. 5 illustrates an example flow for detecting whether data available to an unmanned vehicle may be trusted, according to embodiments.

Turning to FIGS. 5-13, those figures illustrate example flows for facilitating an autonomous navigation (and similarly other autonomous operations) of a UAV (and similarly other unmanned vehicles), including detecting whether GPS data (and similarly other data related to the autonomous operation) may be spoofed and for performing a corrective action. FIG. 5 illustrates an example flow for deploying the UAV and facilitating the autonomous navigation. In comparison, FIGS. 6, 7, 8, and 9 illustrate example flows for implementing sensor-based, an image-based, GPS data-based, and trust-based techniques, respectively, to detect the GPS spoofing. FIGS. 10-13 illustrate example flows for implementing signal-strength-based techniques to detect GPS spoofing. FIG. 14 illustrates an example flow for performing a corrective action. Some of the operations of the example flows of FIGS. 5-13 may be similar. Such similarities are not repeated herein in the interest of clarity of explanation.

Further, in the illustrative operations, some of the operations or functions may be embodied in, and fully or partially automated by, modules executed by one or more processors. In the interest of clarity of explanation, a UAV may be described as performing certain operations. Nonetheless, the operations may be performed by a management module of the UAV, such as the management module 420 described in connection with FIG. 4. Further, a central station may also perform some of the operations or other operations. For example, a management module of the central station (e.g., the management module 436 described in connection with FIG. 4) may perform the operations. Other or a combination of other computing devices and modules may be additionally or alternatively used. Also, while the operations are illustrated in a particular order, it should be understood that no particular order is necessary and that one or more operations may be omitted, skipped, and/or reordered.

The example flow 500 of FIG. 5 may start at operation 502, where a UAV may be deployed. For example, an item may be ordered from an electronic marketplace. A central station associated with the electronic marketplace may select a UAV capable of retaining and delivering the item. Accordingly, the central station may transmit information about the flight route (e.g., a source location, a destination location, a flight route, checkpoints along the flight route, etc.) to the UAV. The item may be loaded onto a retaining system of the UAV. In turn, the UAV may launch on a delivery mission.

At operation 504, location data may be monitored. For example, the UAV may receive GPS data from an external source and use the GPS data to autonomously navigate between the source and the destination. Continuously, at time intervals, or based on flight route check points, the UAV may analyze the GPS data along with or independently of other navigation-related data that may be locally generated by one or more sources (e.g., sensors and a computer system) of the UAV. The frequency of the analysis may depend on various contexts. The contexts may be associated with the UAV, other UAVs, the central station, and/or the item. For example, if the UAV has the processing capability or depending on the power level and power consumption of components of the UAV, the UAV may continuously (if processing capability and sufficient power exist) or intermittently (in other situations) analyze the data. In another example, if another UAV is in proximity of the UAV such that establishing a peer-to-peer communication may be possible, the UAV may analyze its data and/or any data received from the other UAV around that point in time. In yet another example, depending on a bandwidth of a wireless network connecting the UAV and the central station, the UAV and the central station may exchange data for local or distributed processing between the two. In a further example, a value of the item (monetary value, delivery urgency value, etc.) may influence the frequency. For instance, the higher the value, the more frequently the analysis may be performed.

At operation 506, GPS spoofing may be detected. For example, the UAV (or the central station) may detect the GPS spoofing based on the analysis. Example flows for detecting the spoofing are further illustrated in FIGS. 6-9.

At operation 508, a corrective action may be performed upon detection of the spoofing. For example, the UAV may perform a combination of corrective actions to confirm, avoid, and/or report the GPS spoofing. What corrective action(s) to perform may also depend on the contexts associated with the UAV, other UAVs, the central station, and/or the item. For example, if the UAV is capable of autonomous navigation based on navigation data of local sensors, the UAV may turn to these sensors to receive the navigation data and continue the autonomous navigation. In another example, if another UAV is in close proximity, the UAV may report and/or confirm the GPS spoofing with that other UAV. In a yet another example, if sufficient network bandwidth exists, the UAV may similarly report and/or confirm the GPS spoofing with the central station. In a further example, if the item has a high value, the UAV may attempt to deliver the item by using the locally generated navigation data for at least a portion of the flight. In comparison, if the item has a low value, the UAV may navigate to a safe area, attempt to return to the source, or park and enter an idle state.

Figure 6:
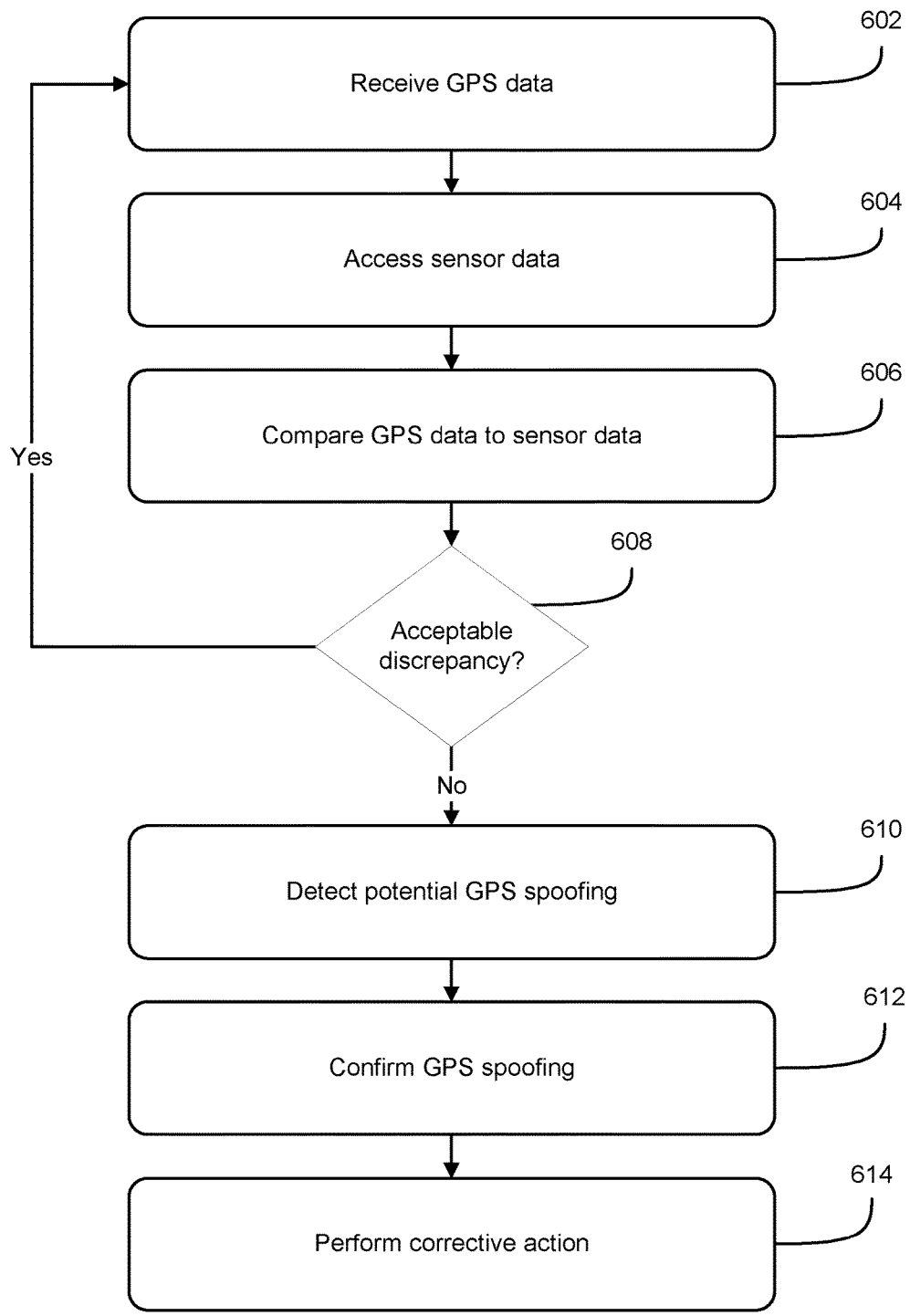
FIG. 6 illustrates an example flow for detecting whether data available to an unmanned vehicle may be trusted based on a navigation sensor of the unmanned vehicle, according to embodiments.

Turning to FIG. 6, the figure illustrates an example flow for detecting whether GPS data may be spoofed (or, similarly, whether other navigation or non-navigation data may be trusted) based on data generated by using local sensors of the UAV. The operations of the example flow may be described as being performed by the UAV (or the computer system thereof). Nonetheless, some or all of the operations of FIG. 6 may be performed at a central station or distributed between the UAV and the central station.

The example flow may start at operation 602, where GPS data may be received. For example, the UAV may receive the GPS data from an external source to the UAV. The received GPS data may be used by the UAV to direct an autonomous flight of the UAV (or, similarly, some other navigation or non-navigation autonomous operation based on the type of the received data).

At operation 604, sensor data may be accessed. The sensor data may represent navigation data collected and processed by a computer system of the UAV from navigation sensors of the UAV. The sensor data may include, for example, an altitude, a heading, a cardinal direction, an acceleration, a speed, a pitch, a yaw, and/or a roll of the UAV, headwind, tailwind, and/or other environmental navigation data. The computer system may generate a flight state using the data, where the flight state may include a collection of the navigation data. For example, the flight state represents how the navigation data may have evolved over time in association with the UAV flight.

At operation 606, the received GPS data may be compared to the sensor data. In an example, the UAV may compare GPS data to sensor data at particular points in time. This may represent a comparison to detect a direct or instantaneous discrepancy between the two types of data. For instance, an altitude from the GPS data at a particular time may be compared to an altitude of the sensor data at that particular point in time. In another example, the UAV may compare the GPS data over time to the flight state. That comparison may indicate a discrepancy over time. For instance, the discrepancy may indicate a deviation between a UAV speed derived from the GPS data and a UAV speed derived from the flight state.

At operation 608, a determination may be performed as to whether the discrepancy may be acceptable. The discrepancy may represent inconsistencies between the GPS data and the sensor data and/or the flight state. In an example, the UAV may compare the discrepancy to a threshold representing a limit on what may be acceptable. If the discrepancy exceeds the threshold, operation 610 may be performed, by which potential GPS spoofing may be determined. Otherwise, operation 602 may be performed, by which additional GPS data may be received. The loop between operations 608 and 602 may represent a monitoring of the received GPS data to detect the spoofing. As explained herein above, the monitoring may be continuous (e.g., operation 602 immediately followed after operation 608) or intermittent (e.g., operation 602 may follow operation 608 based on a time interval or based on a location checkpoint).

Different techniques may be used to generate and set the threshold. In an example, the value of the threshold may be a function of the accuracy of a navigation sensor or of an aggregated accuracy of multiple navigation sensors. In another example, the threshold may be set based on controlled testing of the UAV to determine the limit on the acceptable discrepancy. In yet another example, historical operational performances (e.g., past item deliveries) and historical reported spoofing and sensor data of the UAV and/or of other UAVs may be used. For example, machine learning algorithms may be implemented to analyze such historical data to compute the optimal or a best fitted threshold. If historical data related to other UAVs is used, the UAV and the other UAVs may share at least a common attribute. For instance, the other UAVs may be of a same type as, share common technical capabilities with, and/or have performed similar delivery missions as the UAV. In a further example, the threshold may be a function of the item. For instance, the higher the value of the item, the smaller the value of the threshold may be. This may ensure that, for high valued items, small discrepancies may alert of potential spoofing, thereby providing incremented security and protection for the item delivery. In an additional example, the threshold may depend on calibration of one or more of the navigation sensors given certain environmental conditions. For example, an altimeter may be calibrated prior to the start of the flight to account for barometric pressure. Similarly, reports of weather conditions may be used to adjust other navigation sensors, too. Detected differences between GPS data and the sensor data around the calibration time may be set as the threshold.

Additionally, the UAV may dynamically adjust the threshold. For example, if environmental conditions change and report of the change is provided to the UAV (e.g., an expected barometric pressure drop because of a weather update), the UAV may accordingly adjust the threshold. In another example, one or more reports of detected GPS spoofing at a location current to the UAV location may cause the UAV to adjust the threshold. In such a case, the UAV may reduce the threshold to heighten the scrutiny around detecting the spoofing, thereby providing additional security and protection. Such reports may be received from other UAVs and/or central stations.

At operation 610, potential spoofing may be detected. In an example, because the discrepancy may exceed the threshold, the UAV may determine that the GPS data may be spoofed. The likelihood of the spoofing may be a function of how large the discrepancy may be (or by how much the discrepancy may exceed the threshold). The larger the discrepancy, the higher the likelihood may be.

At operation 612, the GPS spoofing may be confirmed. In particular, the UAV may perform different actions to confirm the GPS spoofing (e.g., to determine whether the likelihood is valid, should be increased, or should be decreased). Various techniques may be used. In an example, the UAV may keep monitoring and analyzing the GPS data in light of sensor data for a pre-determined period of time. In another example, the UAV may collect additional sensor data from additional navigation sensors and use the additional data for the GPS data comparison. For instance, if the UAV had collected data from an altimeter only, the UAV may also collect data from a gyroscope. In yet another example, the UAV may maintain its position for a period of time (e.g., the flight state would show no navigation progress) and may monitor how the GPS data changes during that period of time. If the GPS data changes showing some navigation progress, the spoofing may be confirmed. In a further technique, the UAV may perform any of the other spoofing detection techniques illustrated in FIG. 7-9 to confirm the spoofing. To illustrate, the UAV may confirm the spoofing by requesting or listening to reports of spoofing from other UAVs or from the central station. For instance, the UAV may provide the flight state to the central station. In turn, the central station may determine an approximate location of the UAV based on the flight state. If the approximate location differs beyond the threshold from a location derived from the GPS data, the GPS spoofing may be confirmed. This type of confirmation may also be performed locally at the UAV. In another illustration, the approximate location of the UAV may be compared to a map showing spoofing hot spots. If the approximate location matches one of the spoofing hot spots, the spoofing may be confirmed.

At operation 614, a corrective action may be performed. Generally, the UAV may perform a corrective action that may involve directing the autonomous flight, or a portion thereof, independently of and without using the spoofed GPS data. For example, the UAV may use the sensor data of the navigation sensors for its autonomous flight. In this case, the autonomous flight may continue per the planned flight route. Alternatively, the autonomous flight may be altered to fly to a safe location (e.g., a known location where spoofing is confirmed not to exist). In yet another example, the UAV may change its position (e.g., gained altitude) in an attempt to avoid the GPS spoofing. In a further example, the UAV may park (e.g., lower its altitude until reaching the ground) and enter an idle state. In another example, the UAV may report information about the spoofing to other UAVs and/or the central station and may enable remote control over the flight from the central station. Regardless of the corrective action, the UAV may continuously or intermittently monitor and analyze the received GPS data to determine whether the GPS data may be re-trusted. If so, the UAV may revert to using the GPS data. Further, information about the performed corrective action and its result (e.g., whether spoofing was successfully avoided) may be reported to other UAVs and/or the central station.

Figure 7:
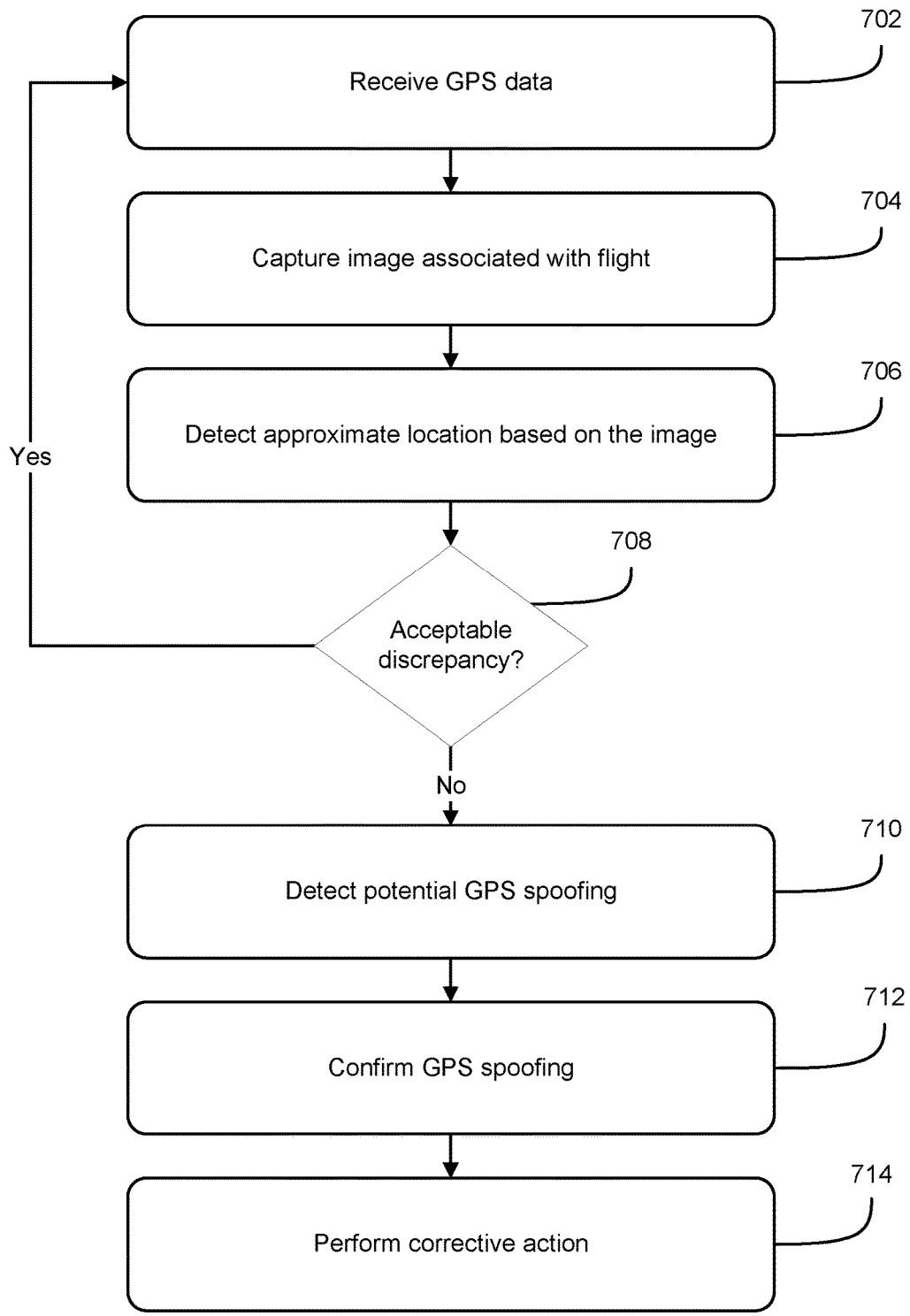
FIG. 7 illustrates another example flow for detecting whether data available to an unmanned vehicle may be trusted based on an imaging sensor of the unmanned vehicle, according to embodiments.

Turning to FIG. 7, the figure illustrates an example flow for detecting whether GPS data may be spoofed (or, similarly, whether other navigation or non-navigation data may be trusted) based on data generated by using optical sensors of the UAV. The operations of the example flow may be described as being performed by the UAV (or the computer system thereof). Nonetheless, some or all of the operations of FIG. 7 may be performed at a central station or distributed between the UAV and the central station.

The example flow may start at operation 702, where GPS data may be received. At operation 704, an image associated with the autonomous flight may be captured (e.g., generated). For example, the computer sensor may request the image from an imaging device of the UAV. In turn, the imaging device may activate optical sensors to generate image data. The image data may be provided to the computer system as the captured image. In an example, the captured image may be a colored image, a black and white image, a gray scale image, or an infrared image of a location underneath the UAV. The frequency of generating images and the respective resolutions may be based on the contexts associated with the UAV, the central station, other UAVs, and/or the item. For example, depending on the processing capability or the level of power, the frequency may be set. Higher processing capability and/or power may generally lead to a higher frequency. In another example, if the processing should be distributed between the UAV and the central station and/or whether image data should be transmitted to the central station, the frequency may be a function of the available bandwidth of the network between the UAV and the central station. Generally, the larger the bandwidth, the higher the frequency may be. In yet another example, if proximate UAVs have reported spoofing and/or the central station has alerted the UAV of potential spoofing, the frequency may be increased. In a further example, the larger the value of the item, the higher the frequency may be. The resolution may be similarly set or adjusted based on such contexts. Additionally or alternatively, the frequency and/or resolution may be functions of checkpoints along the flight route. Each checkpoint may specify the number and resolutions of images to be captured. For example, at launch, a single low resolution image may suffice. At a later checkpoint (e.g., upon arrival to a supposed delivery location), a larger number of high resolution images may be needed.

At operation 706, an approximate location of the UAV may be determined based on the image. For example, various image-processing techniques may be used to detect one or more objects in the image. These techniques may include, for instance, object recognition, pattern recognition, text recognition (e.g., to read texts on buildings and street signs), edge recognition, and/or other techniques. The detected objects may be compared to known objects. These known objects may be accessed from a data store (e.g., from local memory of the UAV or from storage associated with the central station) and may have known locations. Matches between the detected and known objects may result in approximating the UAV location based on the corresponding known locations. In another example, the captured image may be compared to known images of known locations. The comparison may use any of the above image processing techniques. These known images may be also be available from a data store. A match to a known image may result in approximating the UAV location based on the corresponding known image. In yet another example, the received GPS data may be analyzed to determine a GPS-based location. That location may be used to retrieve a corresponding known image from the data store (e.g., the known image having the known location corresponding to the GPS-based location). The captured image and the known image may be compared. If the two images are inconsistent or a discrepancy between the two is unacceptable, potential spoofing may be detected. In a further example, if certain environmental conditions are expected along the path (e.g., greenery, cool temperature, etc.) and the image data indicates otherwise (e.g., desert colors, hot temperature, through color and/or infrared images), potential spoofing may be detected.

At operation 708, a determination may be performed as to whether a detected discrepancy may be acceptable. The UAV may compute and compare the discrepancy to a threshold. The discrepancy may be computed based on the technique used under operation 706. If objects are compared, the discrepancy may represent a similarity (or inconsistency) value between the objects. If images are compared, the discrepancy may represent a similarity (or inconsistency) value between the images. Typically, the image processing techniques may output such values. If locations are compared, the discrepancy may represent the difference (e.g., distance) between the locations. If environmental conditions are compared, the discrepancy may represent the difference between the environmental conditions. The threshold may be set and adjusted in a manner similar to what is described in connection with operation 608 of FIG. 6. In addition, the threshold may depend on the accuracy of the imaging device (e.g., sensitivity of the optical sensors) and/or the resolution. The higher the accuracy and/or resolution, the smaller the threshold may be. If the discrepancy exceeds the threshold, operation 710 may be performed, by which potential GPS spoofing may be determined. Otherwise, operation 702 may be performed, by which additional GPS data may be received. The loop between operations 708 and 702 may represent a monitoring of the received GPS data to detect the spoofing. The monitoring may be continuous or intermittent based on the contexts associated with the UAV, the central station, other UAVs, and/or the item.

At operation 710, potential GPS spoofing may be detected based on the comparison of the discrepancy to the threshold. The greater the discrepancy, the higher the likelihood may be. In this operation, the likelihood may also be a function of the image resolution. In particular, the greater the resolution (and the discrepancy), the higher the likelihood may be.

At operation 712, the GPS spoofing may be confirmed. The UAV may implement various techniques to do so. For example, additional images (or a higher frequency of image generation), higher image resolution, and/or more complex and accurate image processing techniques may be used to confirm the GPS spoofing. In addition, a combination of the image-based detection techniques may be used. For the example, if object comparison may have been used for the detection, image comparison may be used for the confirmation. In yet another example, the UAV may change its position and/or the focus of the imaging device to capture a more detailed image. For instance, the UAV may lower its altitude and/or zoom in on an intersection with corresponding street signs. Text recognition may be applied to an image of the sign to recognize the alphanumeric text. This text may be used to approximate the location by retrieving a known location corresponding to the alphanumeric text from a data store. If the approximate location remains inconsistent with the GPS-based location, the spoofing may be confirmed. In a further example, the UAV may perform any of the other spoofing detection techniques illustrated in FIGS. 6 and 8-9.

At operation 714, a corrective action may be performed. For example, the UAV may perform a corrective action similar to what is described in connection with operation 614 of FIG. 6. In another example, the UAV may use the camera for the autonomous flight. For example, at night conditions, the UAV may tilt the camera to face the sky and capture images of the stars. Various constellations of the stars may be identified. These constellations may be used to direct the autonomous flight. In another example, the camera may capture images of the ground. Objects, such as landmarks may be identified. Known locations of these objects may be used to direct the autonomous flight.

Figure 8:
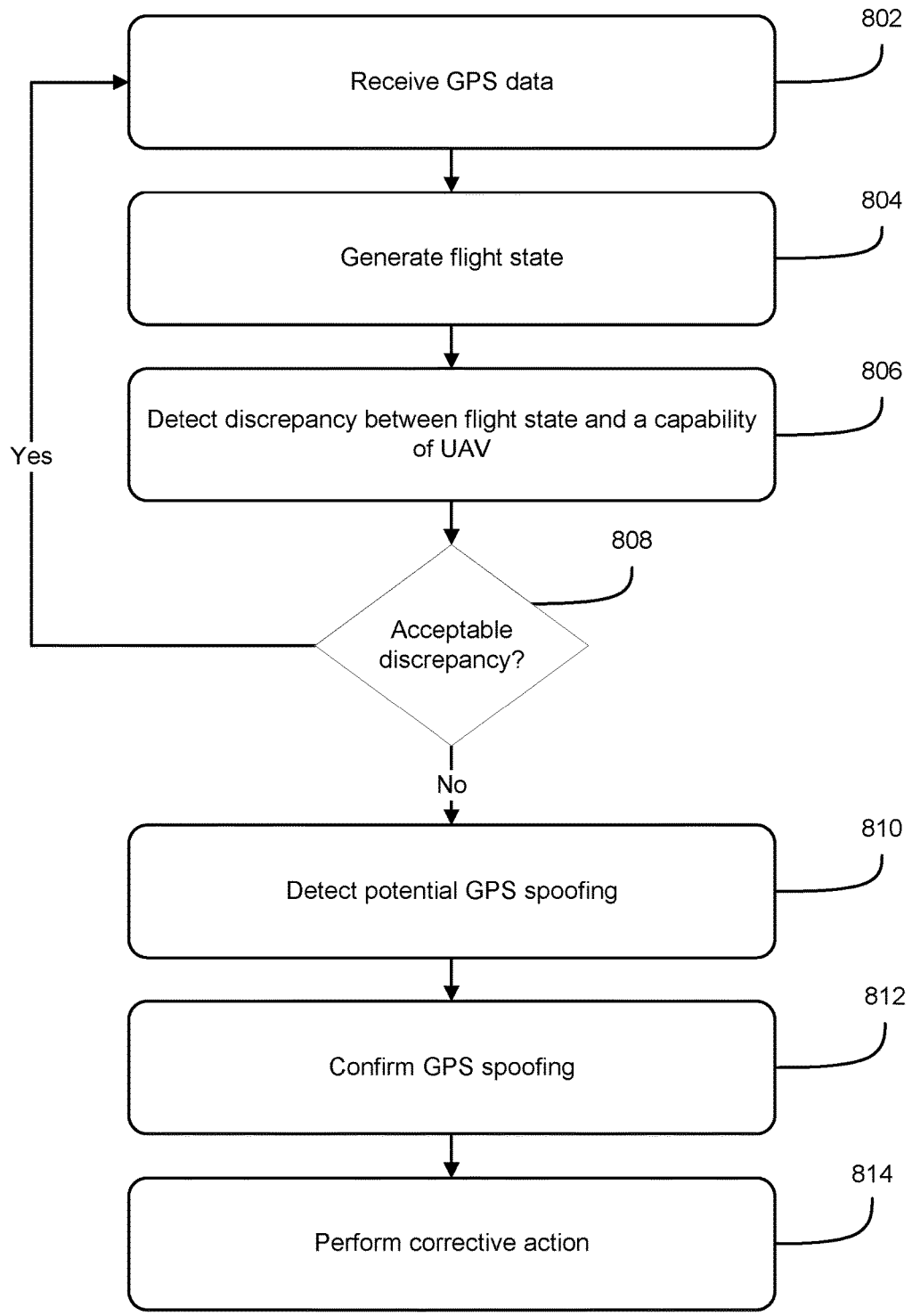
FIG. 8 illustrates an example flow for detecting whether data available to an unmanned vehicle may be trusted based on the data, according to embodiments.

Turning to FIG. 8, the figure illustrates an example flow for detecting whether GPS data may be spoofed (or, similarly, whether other navigation or non-navigation data may be trusted) based on an analysis of the GPS data and absent of an analysis of data generated by using local sensors of the UAV. The operations of the example flow may be described as being performed by the UAV (or the computer system thereof). Nonetheless, some or all of the operations of FIG. 8 may be performed at a central station or distributed between the UAV and the central station.

The example flow may start at operation 802, where GPS data may be received. At operation 804, a flight state may be generated based on the GPS data. For example, the UAV (or a computer system thereof) may derive different navigation data (e.g., speed, heading, etc.) from the GPS data over time and, accordingly, generate the flight state.

At operation 806, a discrepancy between the flight state and a capability of the UAV may be detected. For example, the UAV may compare the flight state to known UAV capabilities associated with the autonomous flight. These capabilities may represent operations that the UAV may be capable of performing. For instance, the capabilities may include a range (e.g., minimum and maximum) of speed, heading, acceleration, altitude, yaw, roll, pitch, and/or other flight parameters that the UAV may be capable of performing. Different comparison techniques may be used. In an example, the UAV may analyze the flight state to detect sudden changes. A sudden change may correspond to a capability (or operation) that the UAV may not support. For example, a sudden change in speed may indicate an unsupported (or impossible) UAV acceleration. In another example, a sudden change in location may indicate an unsupported UAV speed. In yet another example, the UAV may analyze the flight state to detect more subtle changes over time. If the flight state indicates that an operation would have been performed over time and if such an operation is unsupported, that discrepancy may indicate potential spoofing. For instance, if over a period of time, the flight state indicates a traveled distance greater than what would have been possible, that discrepancy may indicate potential spoofing. In a further example, the flight state may indicate a flight route of the UAV. At deployment, or based on a request to the central station, the UAV may receive and store a predefined flight route. Accordingly, the UAV may compare the two routes to determine a discrepancy.

At operation 808, a determination may be performed as to whether a detected discrepancy may be acceptable. The UAV may compare the discrepancy to a threshold. The threshold may be set and adjusted in a manner similar to what is described in connection with operation 608 of FIG. 6. In addition, the threshold may depend on the capabilities of the UAV. For example, the threshold may be set as a function (e.g., ten percent) of the maximum speed or some other flight parameter. If the discrepancy exceeds the threshold, operation 810 may be performed, by which potential GPS spoofing may be determined. Otherwise, operation 802 may be performed, by which additional GPS data may be received. The loop between operations 808 and 802 may represent a monitoring of the received GPS data to detect the spoofing. The monitoring may be continuous or intermittent based on the contexts associated with the UAV, the central station, other UAVs, and/or the item.

At operation 810, potential spoofing may be detected based on the comparison of the discrepancy and the threshold. At operation 812, the GPS spoofing may be confirmed. At operation 814, a corrective action may be performed. Operations 810, 812, and 814 may be similar to operation 610, 612, and 614, respectively.

Figure 9:
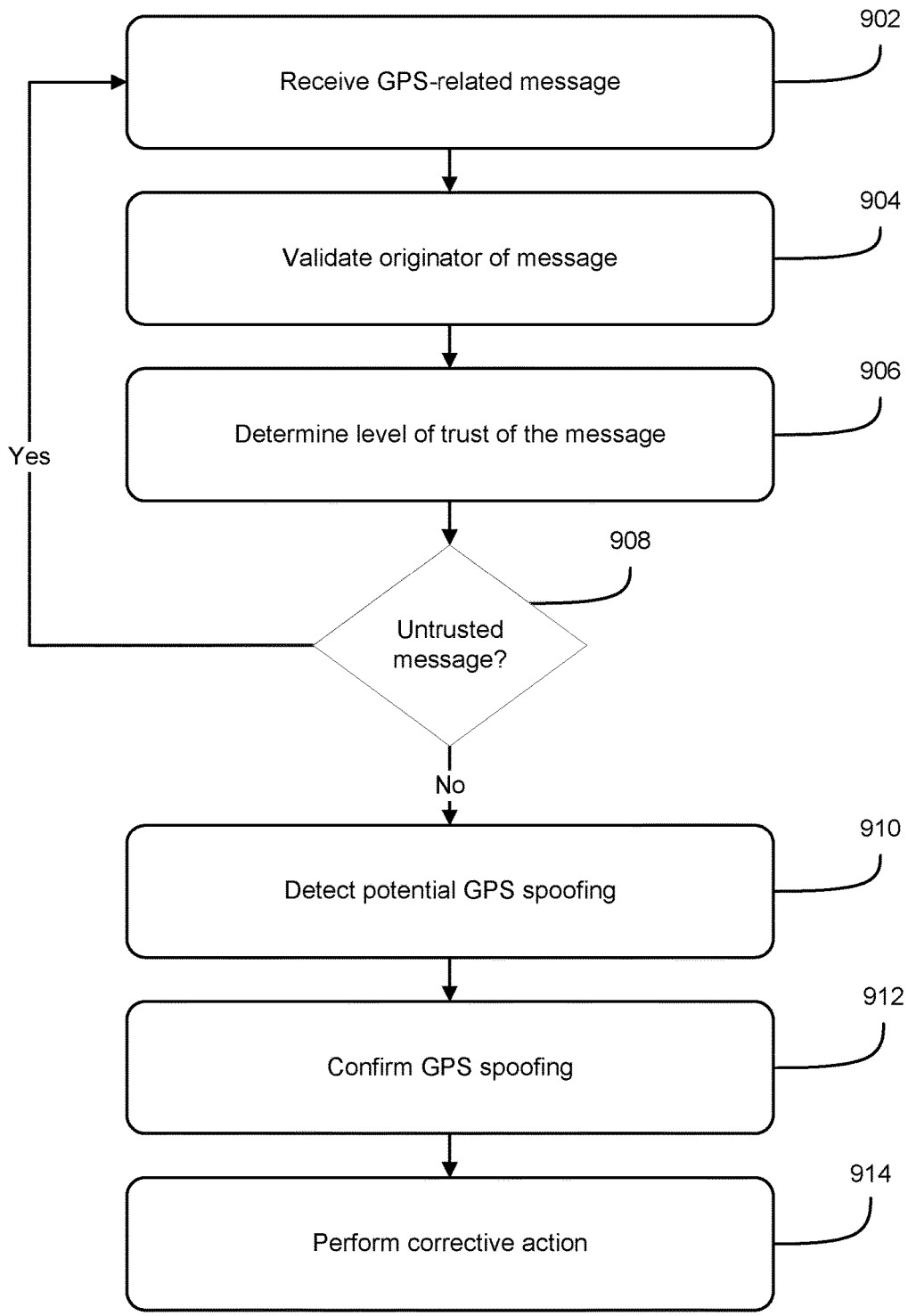
FIG. 9 illustrates an example flow for detecting whether data available to an unmanned vehicle may be trusted based on data of another unmanned vehicle, according to embodiments.

Turning to FIG. 9, the figure illustrate an example flow for detecting whether GPS data may be spoofed (or, similarly, whether other navigation or non-navigation data may be trusted) based on information available from other trusted UAVs. The operations of the example flow may be described as being performed by the UAV (or the computer system thereof). Nonetheless, some or all of the operations of FIG. 9 may be performed at a central station, at another UAV, or distributed between the UAVs and the central station. In addition, the operations of the example flow may be described in connection with another UAV that may generate a GPS-related message. Nonetheless, some or all of the operations of FIG. 9 may be performed based on a central station generating the GPS-related message instead.

The example flow may start at operation 902, where a GPS-related message may be received. For example, a report (or some other form of indication or message) about detected GPS spoofing may be transmitted from another UAV over a network (e.g., a peer-to-peer network or based on using an intermediary such as the central station). The report may include information about a potential or approximate location of the spoofing or of the area or location where the spoofing may have been detected. The report may also indicate the time at which the spoofing may have been detected. The report may further identify the particular UAV that may have detected the spoofing and/or the service provider of that UAV.

At operation 904, an originator of the GPS-related message (e.g., the particular UAV) may be validated. Validating the originator may include establishing a trust associated with the originator. In an example, the UAV and the originator (the other UAV) may exchange identifiers and tokens. As such, the UAV may identify the originator and receive the respective token. Based on the token, the UAV may authenticate the identity of the originator and accordingly establish the trust. Additionally or alternatively, the UAV may receive an identifier of the service provider of the originator. If the service provider is trusted, the UAV may accordingly trust the originator. Upon validation, operation 906 may be performed. Otherwise, the UAV may disregard the GPS-related message.

At operation 906, a level of trust may be determined for the GPS-related message. This level of trust may represent another layer for providing additional security and protection. In particular, trusting the originator may not be sufficient because sometimes the originator may inaccurately detect the spoofing. By also determining the level of trust of the GPS-related message, this inaccuracy risk may be mitigated. In an example, the level of trust may be based on a number of factors. The factors may include the proximity of the two UAVs, the freshness of the message (or the time of the message relative to the UAV arriving to the reported location), the credibility of the originator, the credibility of the originator's service provider, the number of other messages of GPS spoofing associated with the same or proximate location, and/or the consistency or persistence of such messages over time. In particular, the closer in distance, or more proximate the two UAVs, the greater the level of trust may be. In another example, the fresher the message, the greater the level of trust may be. For instance, the GPS data of the UAV may be associated with a first time frame. In comparison, the message of the spoofing may be associated with a second time frame. The freshness may represent the difference between the two time frames. In certain situations, the message may be considered to be fresh enough (e.g., the level of trust acceptable) based on this difference. For instance, the higher the value of the item, the smaller the acceptable time difference may be. In yet another example, the more credible the originator or the service provider, the greater the level of trust may be. The credibility of the originator may be based on the history of GPS spoofing detected and/or reported messages by the originator and/or the relative volume of the confirmed messages, inaccurate messages, and unconfirmed messages. The credibility may additionally or alternatively depend on the originator's manufacturer, type, model, accuracy, capabilities, and/or spoofing detection techniques. The credibility of the service provider may be similarly determined. Further, the larger the volume of reported messages and/or the larger the persistence of these messages over time (e.g., over a long period of time, GPS spoofing may have been reported for a particular location), the greater the level of trust may be.

At operation 908, a determination may be performed as to whether the GPS-related message may be trusted. This determination may be based on the level of trust. In particular, if the level of trust exceeds a threshold, the message may be trusted. Accordingly, operation 910 may be performed, by which potential GPS spoofing may be determined. Otherwise, operation 902 may be performed, by which additional GPS-related messages may be received. The loop between operations 908 and 902 may represent a monitoring of the received GPS-related messages to detect the spoofing. The monitoring may be continuous or intermittent based on the contexts associated with the UAV, the central station, other UAVs, and/or the item. The threshold may be based on, for example, the item. The more valuable the item, the higher the threshold may be.

At operation 910, potential spoofing may be detected based on determining that the GPS-related message may be trusted. At operation 912, the GPS spoofing may be confirmed. At operation 914, a corrective action may be performed. Operations 910, 912, and 914 may be similar to operation 610, 612, and 614, respectively.

FIGS. 10-13 are intended to depict a variety of situations in which signal strength of navigation data (e.g., GPS data received from an external source) is analyzed to determine whether the navigation is trusted or untrusted. It should be appreciated that any of the examples herein, including those described in connection with FIGS. 10-13 may be performed by the UAV (or the computer system thereof), a central station, another UAV (or other unmanned/manned aerial/non-aerial vehicle). Although examples may be given that describe the UAV as performing the determination that the GPS data is untrusted, it should be appreciated that any system described herein may provide such determinations (e.g., as a service). In some embodiments, the detecting system may additionally provide a notification (e.g., to the UAV, to multiple UAVs, to another system, etc.) that indicates that the GPS data received by the UAV is untrusted. Additionally, although examples herein may described the GPS data as directing autonomous operations of a vehicle (e.g., a UAV), these examples may equally be applied to situations in which the vehicle is not performing autonomous operations (e.g., when the vehicle is manned and operated by a person).

Figure 10:
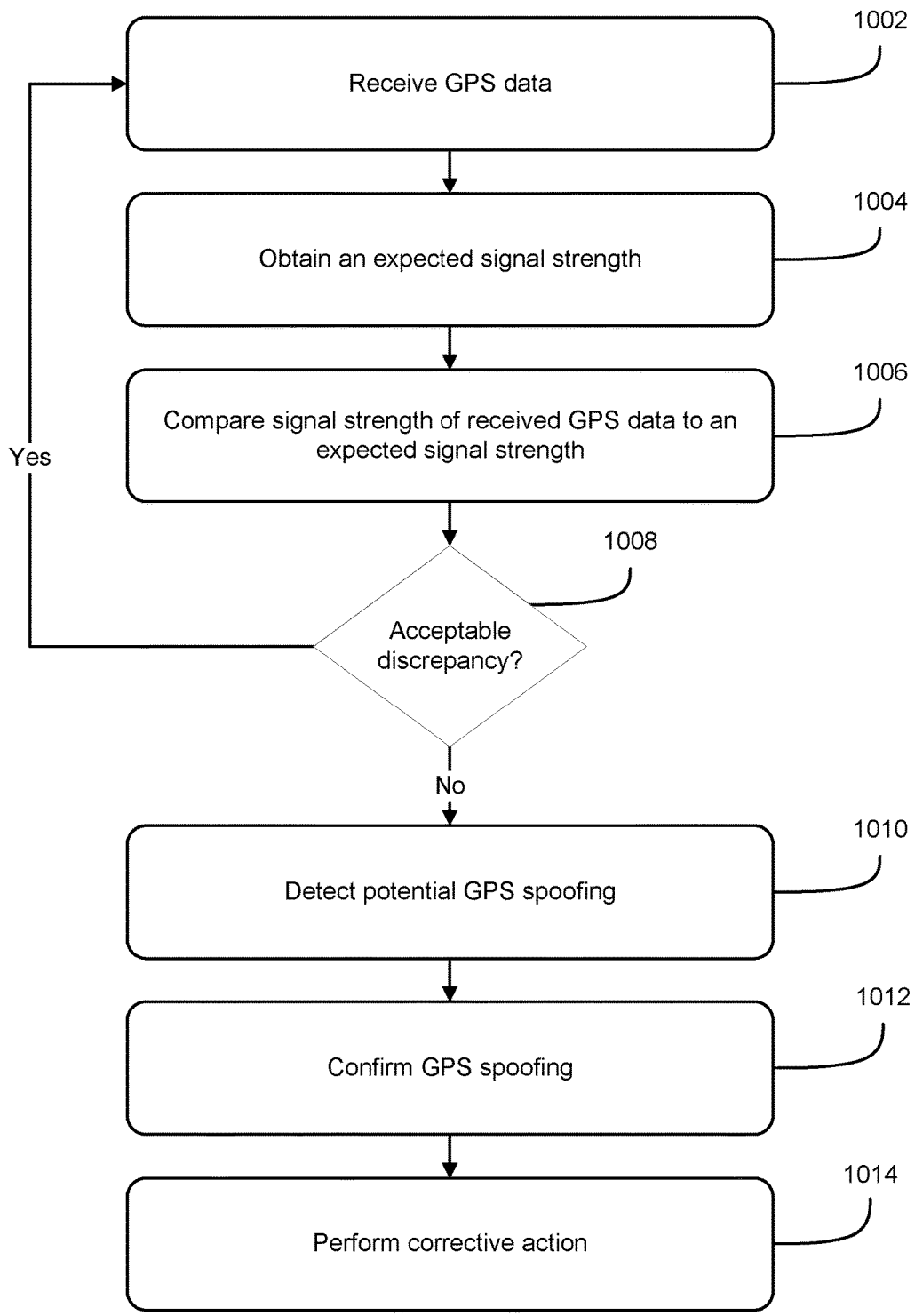
FIG. 10 illustrates an example flow for detecting data available to an unmanned vehicle may be trusted based on a single strength of the data received by the unmanned vehicle, according to some embodiments.

Turning to FIG. 10, the figure illustrates an example flow for detecting whether GPS data may be spoofed (or, similarly, whether other navigation or non-navigation data may be trusted) based on a single strength of navigation data (e.g., GPS data) received by the UAV. The operations of the example flow may be described as being performed by the UAV (or the computer system thereof). Nonetheless, some or all of the operations of FIG. 10 may be performed at a central station or distributed between the UAV and the central station. The operations discussed within FIG. 10 may similarly be performed by a non-aerial unmanned or manned vehicle.

The example flow may start at operation 1002, where GPS data may be received. For example, the UAV may receive navigation data (e.g., GPS data) from an external source to the UAV (e.g., a satellite or ground-based navigation data source). The received navigation/GPS data may be used by the UAV to direct an autonomous flight of the UAV (or, similarly, some other navigation or non-navigation autonomous operation based on the type of the received data).

At operation 1004, an expected signal strength may be obtained. As a non-limiting example, the expected signal strength information may include predetermined expected signal strengths corresponding to a variety of navigation data source. By way of example, a predetermined expected signal strength may be mapped to a particular type of satellite or ground-based navigation data source. A record/mapping of such information may be stored in memory at the UAV. Upon receipt of the GPS data, the UAV may retrieve the record/mapping and perform a lookup of an expected signal strength range corresponding to the type of device providing the GPS data.

In other embodiments, the UAV may access previously-stored historical navigation data corresponding to signal strengths previously recorded at a variety of locations. In some examples, the historical navigation data may be collected by the UAV, other UAVs, or a combination of the two. The historical navigation data, in some examples, may be obtained/received and stored in memory at the UAV prior to commencement of the autonomous operations performed by the UAV. To obtain an expected signal strength, a current location indicated by the GPS data received at 1002 may be used to obtain a previously-recorded signal strength from the historical navigation data.

In still further examples, topographical data indicating natural and/or urban landmarks (e.g., mountains, rivers, valleys, buildings, tunnels, etc.) may be stored in memory at the UAV. The topographical data may be utilized to adjust an expected signal strength in the same manner as discussed above. For example, an expected signal strength may be reduced when a current location (as indicated by the received GPS data at 1002) indicates that the UAV has entered an area with large and/or many obstructions (e.g., a mountain range, a city with skyscrapers, etc.).

In some examples, the expected signal strength may be obtained using a machine learning algorithm. The machine learning algorithm may be trained, for example, using historical data (e.g., previously received GPS data (and corresponding signal strengths) and at least one of: internal sensor data, environmental conditions data, topographical data, or any suitable data related to past operations of the UAV (or another UAV). In some examples, the expected signal strength (or a range of signal strengths) may be provided by the machine learning algorithm using current conditions data (e.g., a current location, mapped power ranges corresponding to the GPS source, internal sensor data, environmental conditions data, topographical data) to determine an output corresponding to an expected signal strength (or range of expected signal strengths). Similarly, the machine learning algorithm, trained from historical data, may utilize current conditions data to determine a threshold value (or range) by which the signal strength of received GPS data may differ from an expected signal strength.

At operation 1006, the signal strength of the received GPS data may be compared to the expected signal strength obtained at 1004. In an example, the UAV may compare signal strengths of GPS data to expected signal strengths at particular points in time. This may represent a comparison to detect a direct or instantaneous discrepancy between the two types of data. For instance, a signal strength of the GPS data at a particular time may be compared to an expected signal strength at that particular point in time and/or corresponding to a same location. In another example, the UAV may compare the signal strength of the GPS data over time to the expected signal strengths. These comparisons may indicate a discrepancy over time.

At operation 1008, a determination may be performed as to whether the discrepancy may be acceptable. The discrepancy may represent inconsistencies between the signal strength of the GPS data received at 1002 and the expected signal strength obtained at 1004. In some embodiments, the source of the GPS data may be associated with an expected power range. Accordingly, if a discrepancy is determined between the signal strength of the GPS data and the expected power range (e.g., the signal strength of the GPS data does not fall within the expected power range), the GPS data may be determined to be spoofed (e.g., regardless of the expected signal strength obtained at 1006). In such situations, the flow may proceed directly to operation 1014 to perform a corrective action.

In another example, the UAV may compare the discrepancy to a threshold representing a limit on what may be acceptable. If the discrepancy exceeds the threshold, operation 1010 may be performed, by which potential GPS spoofing may be determined. Otherwise, operation 1002 may be performed, by which additional GPS data may be received. The loop between operations 1008 and 1002 may represent a monitoring of the received GPS data to detect the spoofing. As explained herein above, the monitoring may be continuous (e.g., operation 1002 immediately followed after operation 1008) or intermittent (e.g., operation 1002 may follow operation 1008 based on a time interval or based on a location checkpoint).

Different techniques may be used to generate and set the threshold. In an example, the value of the threshold may be a function of the accuracy of a navigation sensor or of an aggregated accuracy of multiple navigation sensors used to collect data from which an expected signal strength was derived. In another example, the threshold may be set based on controlled testing of the UAV and/or GPS data sources (e.g., satellites, ground-based sources, etc.) to determine the limit on the acceptable discrepancy. In some examples, machine learning algorithms may be implemented to analyze historical data (e.g., historically received GPS data, sensor data of the UAV, current environmental/topographical conditions, etc.) to compute the optimal or a best fitted threshold. If historical data related to other UAVs is used, the UAV and the other UAVs may share at least a common attribute. For instance, the other UAVs may be of a same type as, share common technical capabilities with, and/or have performed similar delivery missions as the UAV. In a further example, the threshold may be a function of the item. For instance, the higher the value of the item, the smaller the value of the threshold may be. This may ensure that, for high valued items, small discrepancies may alert of potential spoofing, thereby providing incremented security and protection for the item delivery.

Additionally, the UAV may dynamically adjust the threshold. For example, if environmental conditions change and report of the change is provided to the UAV (e.g., an expected barometric pressure drop because of a weather update), the UAV may accordingly adjust the threshold. In another example, one or more reports of detected GPS spoofing at a location current to the UAV location may cause the UAV to adjust the threshold. In such a case, the UAV may reduce the threshold to heighten the scrutiny around detecting the spoofing, thereby providing additional security and protection. Such reports may be received from other UAVs and/or central stations.

At operation 1010, potential spoofing may be detected. In an example, because the discrepancy may exceed the threshold, the UAV may determine that the GPS data may be spoofed. The likelihood of the spoofing may be a function of how large the discrepancy may be (or by how much the discrepancy may exceed the threshold). The larger the discrepancy, the higher the likelihood may be.

At operation 1012, the GPS spoofing may be confirmed. In particular, the UAV may perform different actions to confirm the GPS spoofing (e.g., to determine whether the likelihood is valid, should be increased, or should be decreased). Various techniques may be used. In an example, the UAV may keep monitoring and analyzing the signal strengths of received GPS data for a pre-determined period of time. In another example, the UAV may collect additional sensor data from additional navigation sensors and use the additional data for the GPS data comparison. For instance, if the UAV had collected data from an altimeter only, the UAV may also collect data from a gyroscope. In yet another example, the UAV may maintain its position for a period of time (e.g., the flight state would show no navigation progress) and may monitor how the GPS data changes during that period of time. If the GPS data changes showing some navigation progress, the spoofing may be confirmed. In a further technique, the UAV may perform any of the other spoofing detection techniques illustrated in FIG. 7-9 to confirm the spoofing. To illustrate, the UAV may confirm the spoofing by requesting or listening to reports of spoofing from other UAVs or from the central station. For instance, the UAV may provide the flight state to the central station. In turn, the central station may determine an approximate location of the UAV based on the flight state. If the approximate location differs beyond the threshold from a location derived from the GPS data, the GPS spoofing may be confirmed. This type of confirmation may also be performed locally at the UAV. In another illustration, the approximate location of the UAV may be compared to a map showing spoofing hot spots. If the approximate location matches one of the spoofing hot spots, the spoofing may be confirmed.

At operation 1014, a corrective action may be performed. Generally, the UAV may perform a corrective action that may involve directing the autonomous flight, or a portion thereof, independently of and without using the spoofed GPS data. For example, the UAV may use the sensor data of the navigation sensors for its autonomous flight. In this case, the autonomous flight may continue per the planned flight route. Alternatively, the autonomous flight may be altered to fly to a safe location (e.g., a known location where spoofing is confirmed not to exist). In yet another example, the UAV may change its position (e.g., gained altitude) in an attempt to avoid the GPS spoofing. In a further example, the UAV may park (e.g., lower its altitude until reaching the ground) and enter an idle state. In another example, the UAV may report information about the spoofing to other UAVs and/or the central station and may enable remote control over the flight from the central station. Regardless of the corrective action, the UAV may continuously or intermittently monitor and analyze the received GPS data to determine whether the GPS data may be re-trusted. If so, the UAV may revert to using the GPS data. Further, information about the performed corrective action and its result (e.g., whether spoofing was successfully avoided) may be reported to other UAVs and/or the central station.

Figure 11:
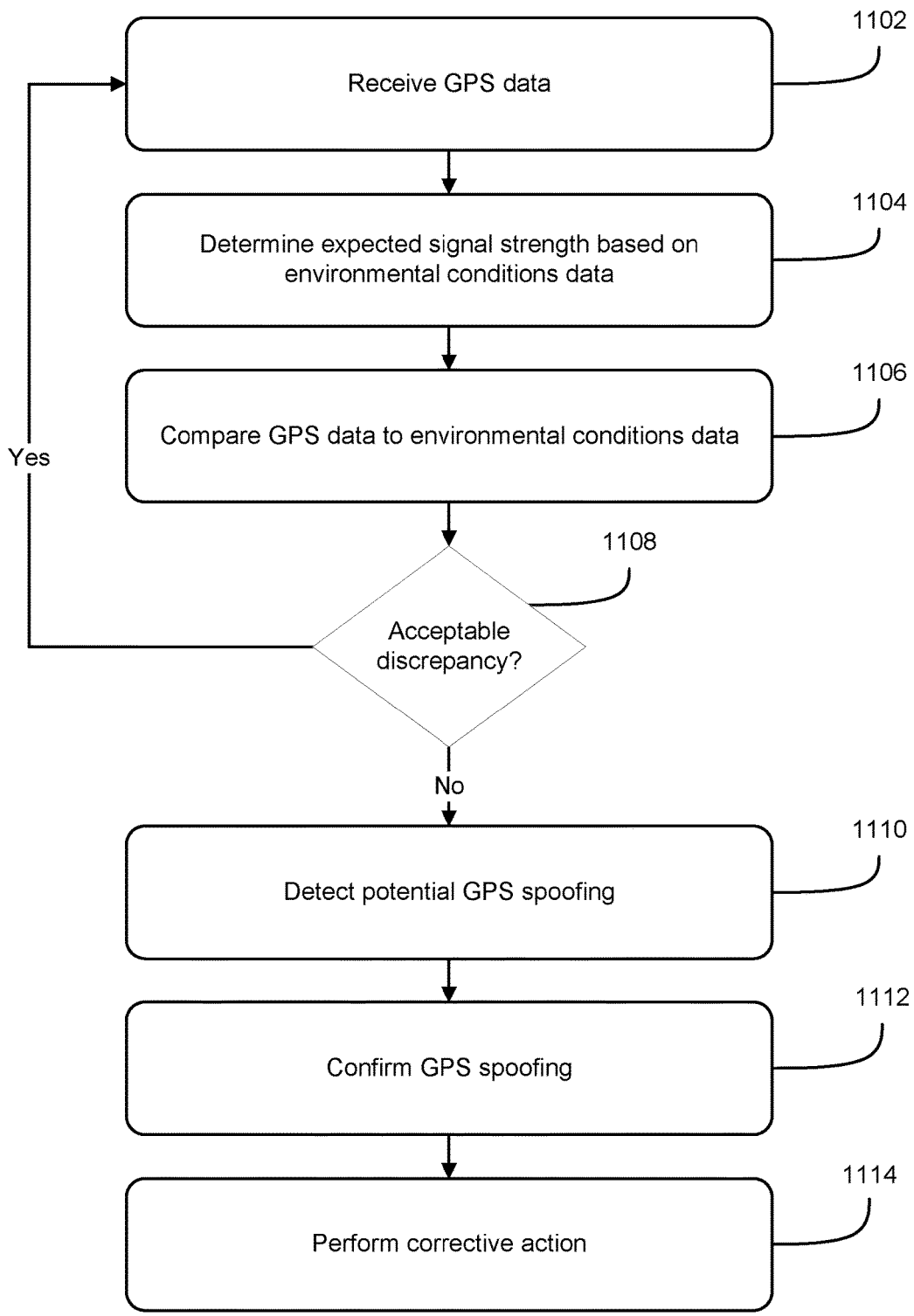
FIG. 11 illustrates an example flow for detecting data available to an unmanned vehicle may be trusted based on a single strength of the data received by the unmanned vehicle and environmental conditions data, according to some embodiments.

Turning to FIG. 11, the figure illustrates an example flow for detecting whether GPS data may be spoofed (or, similarly, whether other navigation or non-navigation data may be trusted) based on a single strength of navigation data (e.g., received GPS data) an environmental conditions data corresponding to the location of the UAV. The operations of the example flow may be described as being performed by the UAV (or the computer system thereof). Nonetheless, some or all of the operations of FIG. 11 may be performed at a central station or distributed between the UAV and the central station. The operations discussed within FIG. 11 may similarly be performed by a non-aerial unmanned or manned vehicle.

The example flow may start at operation 1102, where GPS data may be received. For example, the UAV may receive navigation data (e.g., GPS data) from an external source to the UAV (e.g., a satellite or ground-based navigation data source). The received navigation/GPS data may be used by the UAV to direct an autonomous flight of the UAV (or, similarly, some other navigation or non-navigation autonomous operation based on the type of the received data).

At operation 1104, an expected signal strength may be determined from environmental conditions data. In some examples, environmental conditions data (e.g., weather reports, previously-recorded weather conditions corresponding to previously-traveled navigational routes/locations, etc.) may be stored in memory at the UAV prior to commencing autonomous operations. Additionally, or alternatively, the UAV may be configured to obtain updated environmental conditions data at any suitable time during autonomous operations. An expected signal strength may be obtained/calculated using the environmental conditions data. By way of example, a stored or obtained weather report may indicate that the UAV is at a location that is experiencing heavy rainfall (or heavy rainfall is relatively nearby). Accordingly, the UAV may be configured to calculate an expected signal strength based on the existence of the heavy rainfall.

In some examples, an expected signal strength may first be determined based on historical information, the GPS data source, the distance between the UAV and the GPS data source, a predetermined based signal strength value, or the like. The environmental conditions data may then be used to adjust the expected signal strength value. For example, a previously-recorded signal strength may be modified (e.g., reduced) due to the detection of the environmental condition. Specifically, the UAV may determine that an environmental condition (e.g., heavy rainfall) may likely cause a reduction in signal strength (e.g., by 30%, by a particular amount, etc.). The UAV may then reduce the expected signal strength by the corresponding amount. Any suitable number or types of environmental conditions may occur, each environmental condition may be associated with a particular signal strength adjustment. In other examples, the environmental conditions data may provide an expected signal strength without the need for an initial signal strength value to be determined from other sources In some embodiments, a machine learning algorithm may be utilized to determine (e.g., from historical data of the UAV and/or other UAVs) that a signal strength was affected (e.g., reduced) a particular amount due to a particular environmental condition. Accordingly, navigation data, an expected signal strength, and/or environmental conditions information may be provided as input in the machine learning algorithm to determine an amount/percentage by which the expected signal strength should be modified. In other examples, the machine learning algorithm may output a new expected signal strength from which further comparisons may be made. Additionally, the machine learning algorithm may be configured to output a threshold value (or range, or percentage) by which the received signal strength may differ from the expected signal strength.

At operation 1106, the signal strength of the received GPS data may be compared to the expected signal strength determined at 1104. In an example, the UAV may compare signal strengths of GPS data to expected signal strengths at particular points in time. This may represent a comparison to detect a direct or instantaneous discrepancy between the two types of data. For instance, a signal strength of the GPS data at a particular time may be compared to an expected signal strength at that particular point in time and/or corresponding to a same location. In another example, the UAV may compare the signal strength of the GPS data over time to the expected signal strengths. These comparisons may indicate a discrepancy over time.

At operation 1110, a determination may be performed as to whether the discrepancy may be acceptable. As discussed above, the discrepancy may represent inconsistencies between the signal strength of the GPS data received at 1102 and the expected signal strength obtained at 1104.

In another example, the UAV may compare the discrepancy to a threshold representing a limit on what may be acceptable. If the discrepancy exceeds the threshold, operation 1110 may be performed, by which potential GPS spoofing may be determined. Otherwise, operation 1102 may be performed, by which additional GPS data may be received. The loop between operations 1108 and 1102 may represent a monitoring of the received GPS data to detect the spoofing. As explained herein above, the monitoring may be continuous (e.g., operation 1102 immediately followed after operation 1108) or intermittent (e.g., operation 1102 may follow operation 1108 based on a time interval or based on a location checkpoint). As discussed above in connection with FIG. 10, different techniques may be used to generate and set the threshold.

At operation 1110, potential spoofing may be detected. In an example, because the discrepancy may exceed the threshold, the UAV may determine that the GPS data may be spoofed. The likelihood of the spoofing may be a function of how large the discrepancy may be (or by how much the discrepancy may exceed the threshold). The larger the discrepancy, the higher the likelihood may be.

At operation 1112, the GPS spoofing may be confirmed. In particular, the UAV may perform different actions to confirm the GPS spoofing (e.g., to determine whether the likelihood is valid, should be increased, or should be decreased). Various techniques may be used. By way of example, the UAV may keep monitoring and analyzing the signal strengths of received GPS data for a pre-determined period of time.

At operation 1114, a corrective action may be performed. Generally, the UAV may perform a corrective action that may involve directing the autonomous flight, or a portion thereof, independently of and without using the spoofed GPS data. Any of the corrective actions discussed herein may be performed at operation 1114. As a non-limiting example, the UAV may perform operations to navigate to alter its travel path so as to avoid the rainfall (or other environmental condition) that has been determined to be affecting signal strength of received GPS data.

Figure 12:
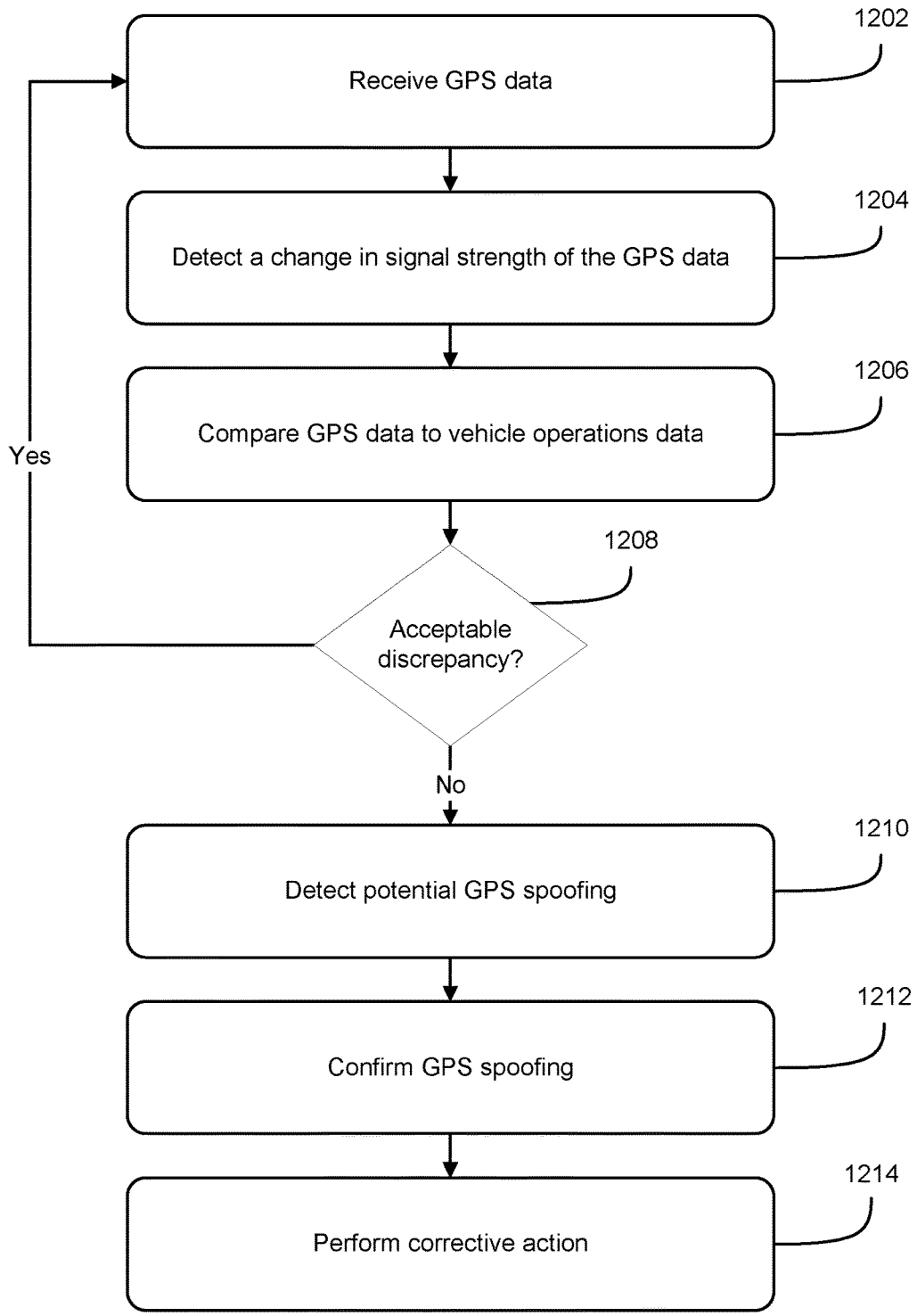
FIG. 12 illustrates an example flow for detecting data available to an unmanned vehicle may be trusted based on changes in single strength of the data received by the unmanned vehicle and vehicle operations data, according to some embodiments.

Turning to FIG. 12, the figure illustrates an example flow for detecting whether GPS data may be spoofed (or, similarly, whether other navigation or non-navigation data may be trusted) based on a change in signal strength of received navigation (e.g., GPS data). The operations of the example flow may be described as being performed by the UAV (or the computer system thereof). Nonetheless, some or all of the operations of FIG. 12 may be performed at a central station or distributed between the UAV and the central station. The operations discussed within FIG. 12 may similarly be performed by a non-aerial unmanned or manned vehicle.

The example flow may start at operation 1202, where GPS data may be received. For example, the UAV may receive navigation data (e.g., GPS data) from an external source to the UAV (e.g., a satellite or ground-based navigation data source). In some examples, the received navigation/GPS data may be used by the UAV to direct an autonomous flight of the UAV (or, similarly, some other navigation or non-navigation autonomous operation based on the type of the received data).

At operation 1204, a change in signal strength of navigation data (e.g., the GPS data received at 1202) may be detected. In some examples, the UAV may be configured to track signal strengths of received navigation data over time. For example, a record may be maintained by the UAV that records various signal strengths of received data for the whole (or some portion) of the time period for which autonomous operations are conducted. The UAV may record signal strengths of every received navigation data, or in some cases, the UAV may record signal strengths of a portion of the received navigation data. By way of example, the UAV may record every tenth signal strength, every twentieth signal strength, a signal strength corresponding to every minute, every five minutes, or at a suitable periodic rate. The periodic rate at which signal strengths are recorded may have consistent intervals (e.g., every thirty seconds between recorded signal strengths) or the periodic rate may vary. As a non-limiting example, the UAV may record a signal strength of received navigation data every five minutes until a change over a threshold amount (e.g., over a 3% gain/loss) is detected. In some cases, upon detecting such a change, the UAV may commence recording signal strengths at a different periodic rate (e.g., every ten seconds). If the UAV detects the signal strength returning to an acceptable range (e.g., a predetermined range), the periodicity of the recorded signal strengths may return to the original rate (e.g., every five minutes). Accordingly, if the signal strength begins to fluctuate in a manner that may indicate a potential spoofing, additional data may be collected to provide more accurate determinations. While the signal strength appears to be remaining substantially constant (e.g., within a predetermined range of change, for example, under the 3% gain or loss from one or more previous recordings), the UAV's computing resources may be reserved and/or utilized for other operations of the UAV. If a change over the threshold amount is not detected, the UAV may continue to loop between the operations 1202 and 1204 indefinitely. However, if a change is detected, the flow may proceed to operation 1206.

At operation 1206, the received GPS data may be compared to vehicle operations data associated with the UAV. Vehicle operations data may include navigation data (e.g., cardinal direction, altitude, acceleration, speed, etc.) generated by sensors of the UAV (e.g., electromagnetic compass, gyroscope, accelerometer, altimeter, barometric pressure sensor, and/or other inertial guidance sensors). The sensor data may include, for example, an altitude, a heading, a cardinal direction, an acceleration, a speed, a pitch, a yaw, and/or a roll of the UAV, headwind, tailwind, and/or other environmental navigation data. The computer system may generate a flight state using the data, where the flight state may include a collection of the navigation data. For example, the flight state represents how the navigation data may have evolved over time in association with the UAV flight. In some embodiments, vehicle operations data may include image data. For example, the computer sensor may request the image from an imaging device of the UAV. In turn, the imaging device may activate optical sensors to generate image data. The image data may be provided to the computer system as a captured image. In an example, the captured image may be a colored image, a black and white image, a gray scale image, or an infrared image of a location underneath the UAV. The frequency of generating images and the respective resolutions may be based on the contexts associated with the UAV, the central station, other UAVs, and/or the item. In still further examples, the vehicle operations data may include known UAV capabilities associated with the autonomous operations of the UAV. These capabilities may represent operations that the UAV may be capable of performing. For instance, the capabilities may include a range (e.g., minimum and maximum) of speed, heading, acceleration, altitude, yaw, roll, pitch, and/or other operation parameters (e.g., flight parameters) that the UAV may be capable of performing.

As a non-limiting example, the GPS data may be compared to navigation data generated by sensors of the UAV. For example, the UAV may receive GPS data from an external source and use the GPS data to autonomously navigate between the source and the destination. Continuously, at time intervals, or based on flight route check points, the UAV may compare the GPS data to navigation data that may be locally generated by one or more sources (e.g., sensors and a computer system) of the UAV. The frequency of the comparison may depend on various contexts. The contexts may be associated with the UAV, other UAVs, the central station, and/or the item. For example, if the UAV has the processing capability or depending on the power level and power consumption of components of the UAV, the UAV may continuously (if processing capability and sufficient power exist) or intermittently (in other situations) compare the data. In a further example, a change in signal strength, as discussed at 1204 may be required before GPS data may be compared to navigation data. In another example, if another UAV is in proximity of the UAV such that establishing a peer-to-peer communication may be possible, the UAV may compare its data and/or any data received from the other UAV around that point in time. By way of example, the other UAV may provide navigation data (e.g., a detected heading, speed, altitude, location, etc.) corresponding to the UAV In yet another example, depending on a bandwidth of a wireless network connecting the UAV and the central station, the UAV and the central station may exchange data (e.g., navigation data corresponding to the UAV) for local or distributed processing between the two. The UAV may compare the received GPS data to locally generated navigation data, navigation data received from the other UAV, and/or navigation data received from the central station to determine whether a discrepancy between the received GPS data and the navigation data exists.

For instance, an altitude from the GPS data at a particular time may be compared to an altitude of the sensor data at that particular point in time. In another example, the UAV may compare the GPS data over time to the flight state. That comparison may indicate a discrepancy over time. For instance, the discrepancy may indicate a deviation between a UAV speed derived from the GPS data and a UAV speed derived from the flight state. In yet another example, a heading (or other flight/operations parameter) of the UAV as indicated by the GPS data may be compared to a heading (or corresponding flight/operations parameter) provided by another UAV and corresponding to the UAV. Similarly, an altitude (or other flight/operations parameter) received from a central station may be compared to an altitude indicated by the received GPS data. These comparisons may indicate an immediate discrepancy, or a discrepancy over time. For instance, the discrepancy may indicate a deviation between a UAV speed derived from the GPS data and a UAV speed derived from the flight state.

As another non-limiting example, the GPS data may be compared to image data (e.g., collected by an imaging device of the UAV). An approximate location of the UAV may be determined based on the image. For example, various image-processing techniques may be used to detect one or more objects in the image. These techniques may include, for instance, object recognition, pattern recognition, text recognition (e.g., to read texts on buildings and street signs), edge recognition, and/or other techniques. The detected objects may be compared to known objects. These known objects may be accessed from a data store (e.g., from local memory of the UAV or from storage associated with the central station) and may have known locations. Matches between the detected and known objects may result in approximating the UAV location based on the corresponding known locations. In another example, the captured image may be compared to known images of known locations. The comparison may use any of the above image processing techniques. These known images may be also be available from a data store. A match to a known image may result in approximating the UAV location based on the corresponding known image. In yet another example, the received GPS data may be analyzed to determine a GPS-based location. That location may be used to retrieve a corresponding known image from the data store (e.g., the known image having the known location corresponding to the GPS-based location). The captured image and the known image may be compared. If the two images are inconsistent or a discrepancy between the two is unacceptable (e.g., over a threshold difference detected), potential spoofing may be detected. In a further example, if certain environmental conditions are expected along the path (e.g., greenery, cool temperature, etc.) and the image data indicates otherwise (e.g., desert colors, hot temperature, through color and/or infrared images), potential spoofing may be detected.

As yet another non-limiting example, a flight state calculated from the received GPS data may be compared to known capabilities of the UAV. These capabilities may represent operations that the UAV may be capable of performing. For instance, the capabilities may include a range (e.g., minimum and maximum) of speed, heading, acceleration, altitude, yaw, roll, pitch, and/or other flight/operations parameters that the UAV may be capable of performing. Different comparison techniques may be used. In an example, the UAV may analyze the flight state to detect sudden changes. A sudden change may correspond to a capability (or operation) that the UAV may not support. For example, a sudden change in speed may indicate an unsupported (or impossible) UAV acceleration. In another example, a sudden change in location may indicate an unsupported UAV speed. In yet another example, the UAV may analyze the flight state to detect more subtle changes over time. If the flight state indicates that an operation would have been performed over time and if such an operation is unsupported, that discrepancy may indicate potential spoofing. For instance, if over a period of time, the flight state indicates a traveled distance greater than what would have been possible, that discrepancy may indicate potential spoofing. In a further example, the flight state may indicate a flight route of the UAV. At deployment, or based on a request to the central station, the UAV may receive and store a predefined flight route. Accordingly, the UAV may compare the two routes to determine a discrepancy.

In other words, any detection technique discussed herein (e.g., sensor-based techniques, image-based techniques, capabilities-based techniques, environment data based techniques, navigational route based techniques, or the like) may be utilized in any suitable combination and/or order when a change in the signal strength of the receive GPS data is detected. Accordingly, a change in the signal strength may, in some cases, not be enough to trigger a determination that the GPS data is untrusted. In some embodiments, both a change in signal strength and an additional indication (e.g., using any suitable technique described herein) may be required.

At operation 1208, a determination may be performed as to whether the discrepancy may be acceptable. As discussed above, the discrepancy may represent inconsistencies between the GPS data received at 1202 and the vehicle operations data. In some examples, the UAV may compare the discrepancy to a threshold representing a limit on what may be acceptable. If the discrepancy exceeds the threshold, operation 1210 may be performed, by which potential GPS spoofing may be determined. Otherwise, operation 1202 may be performed, by which additional GPS data may be received. The loop between operations 1202 and 1208 may represent a monitoring of the received GPS data to detect the spoofing. As explained herein above, the monitoring may be continuous (e.g., operation 1202 immediately followed after operation 1208) or intermittent (e.g., operation 1202 may follow operation 1208 based on a time interval or based on a location checkpoint). As discussed above in connection with FIG. 10, different techniques may be used to generate and set the threshold.

By way of example, an expected signal strength may be obtained using a machine learning algorithm. The machine learning algorithm may be trained, for example, using historical data (e.g., previously received GPS data (and corresponding signal strengths) and at least one of: internal sensor data, environmental conditions data, topographical data, or any suitable data related to past operations of the UAV (or another UAV). In some examples, the expected signal strength (or a range of signal strengths) may be provided by the machine learning algorithm using current conditions data (e.g., a current location, mapped power ranges corresponding to the GPS source, internal sensor data, environmental conditions data, topographical data) to determine an output corresponding to an expected signal strength (or range of expected signal strengths). Similarly, the machine learning algorithm, trained from historical data, may be configured to output a threshold value (or range, or percentage, etc.) by which the signal strength of received GPS data may differ from an expected signal strength.

At operation 1210, potential spoofing may be detected. In an example, because the discrepancy may exceed the threshold (e.g., provided by the machine learning algorithm), the UAV may determine that the GPS data may be spoofed. The likelihood of the spoofing may be a function of how large the discrepancy may be (or by how much the discrepancy may exceed the threshold). The larger the discrepancy, the higher the likelihood may be.

At operation 1212, the GPS spoofing may be confirmed. In particular, the UAV may perform different actions to confirm the GPS spoofing (e.g., to determine whether the likelihood is valid, should be increased, or should be decreased). Various techniques may be used. By way of example, the UAV may keep monitoring and analyzing the signal strengths of the received GPS data and/or discrepancies between the received GPS data and vehicle operations data for a pre-determined period of time.

At operation 1214, a corrective action may be performed. Generally, the UAV may perform a corrective action that may involve directing the autonomous flight, or a portion thereof, independently of and without using the spoofed GPS data. Any of the corrective actions discussed herein (e.g., the corrective actions discussed in connection to FIG. 14) may be performed at operation 1214.

Figure 13:
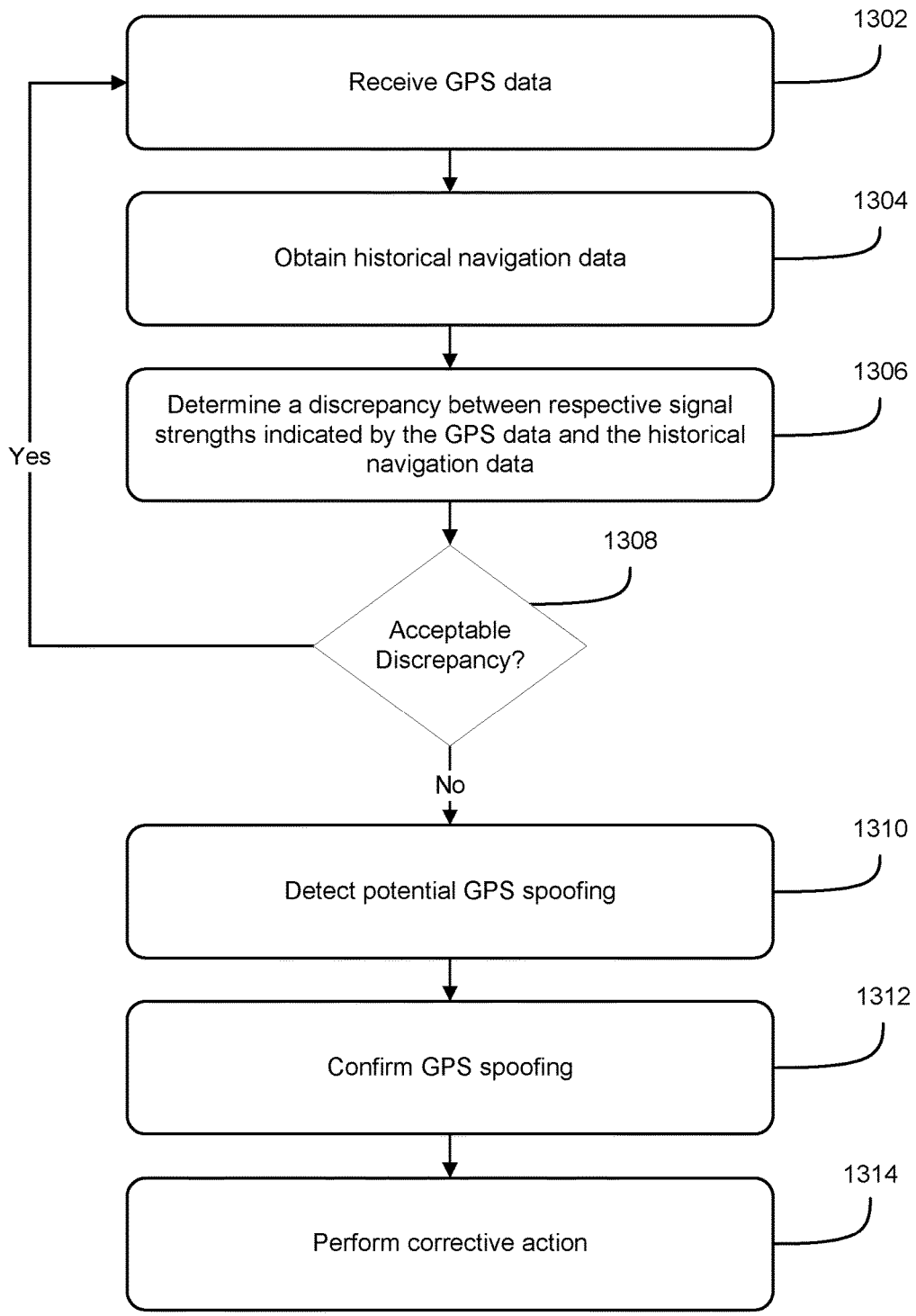
FIG. 13 illustrates an example flow for detecting data available to an unmanned vehicle may be trusted based on a single strength of the data received by the unmanned vehicle and historical navigation data, according to some embodiments.
Figure 14:
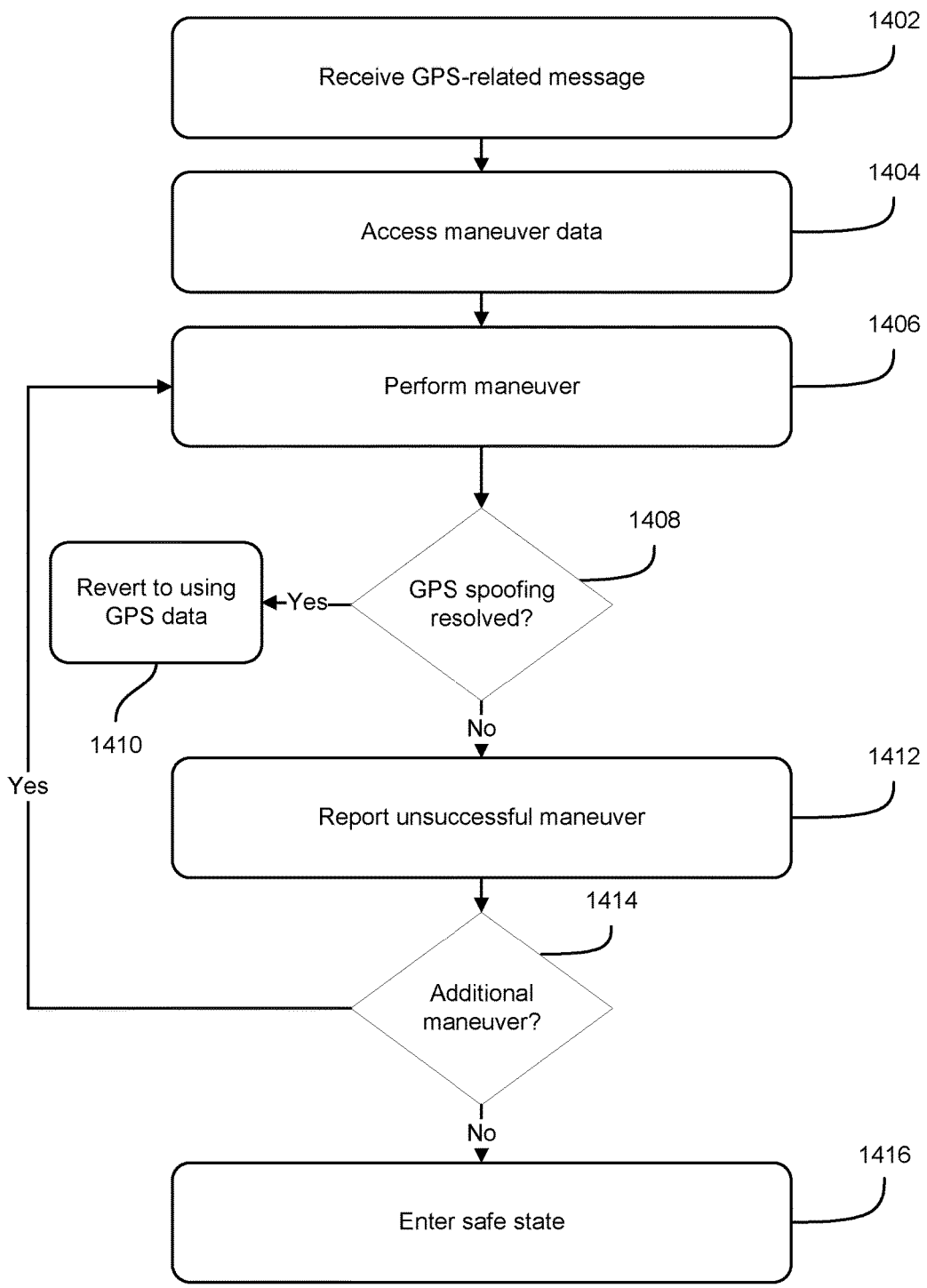
FIG. 14 illustrates an example flow for performing a corrective action, according to embodiments.

Turning to FIG. 13, the figure illustrates an example flow for detecting whether GPS data may be spoofed (or, similarly, whether other navigation or non-navigation data may be trusted) based on a single strength of navigation data (e.g., GPS data) received by the UAV and historical navigation data. The operations of the example flow may be described as being performed by the UAV (or the computer system thereof). Nonetheless, some or all of the operations of FIG. 13 may be performed at a central station or distributed between the UAV and the central station. The operations discussed within FIG. 13 may similarly be performed by a non-aerial unmanned or manned vehicle.

The example flow may start at operation 1302, where GPS data may be received. For example, the UAV may receive navigation data (e.g., GPS data) from an external source to the UAV (e.g., a satellite or ground-based navigation data source). The received navigation/GPS data may be used by the UAV to direct an autonomous flight of the UAV (or, similarly, some other navigation or non-navigation autonomous/non-autonomous operation based on the type of the received data).

At operation 1304, historical navigation data may be obtained. As discussed above, historical navigation data may include signal strengths that were previously recorded at a variety of locations. In some examples, the historical navigation data may be collected by the UAV, other UAVs, one or more central stations, or any suitable combination of the above. The historical navigation data, in some examples, may be obtained/received and stored in memory at the UAV prior to commencement of the autonomous operations performed by the UAV. To obtain an expected signal strength, a current location indicated by the GPS data received at 1302 may be used to obtain a previously-recorded signal strength from the historical navigation data.

At operation 1306, a discrepancy may be determined between respective signal strengths indicated by the GPS data and the historical navigation data. In at least one embodiment, an expected signal strength may be obtained. To obtain an expected signal strength, a current location indicated by the GPS data received at 1302 may be used to obtain a previously-recorded signal strength from the historical navigation data. The signal strength of the received GPS data may be compared to the expected signal strength obtained from the historical navigation data. In an example, the UAV may compare signal strengths of GPS data to expected signal strengths at particular points in time. This may represent a comparison to detect a direct or instantaneous discrepancy between the two types of data. For instance, a signal strength of the GPS data at a particular time may be compared to an expected signal strength at that particular point in time and/or corresponding to a same location. In another example, the UAV may compare the signal strength of the GPS data over time to the expected signal strengths. These comparisons may indicate a discrepancy over time.

In yet another example, an expected signal strength may be obtained using a machine learning algorithm. The machine learning algorithm may be trained, for example, using historical data (e.g., previously received GPS data (and corresponding signal strengths) and at least one of: internal sensor data, environmental conditions data, topographical data, or any suitable data related to past operations of the UAV (or another UAV). In some examples, the expected signal strength (or a range of signal strengths) may be provided by the machine learning algorithm using current conditions data (e.g., a current location, mapped power ranges corresponding to the GPS source, internal sensor data, environmental conditions data, topographical data) to determine an output corresponding to an expected signal strength (or range of expected signal strengths). Accordingly, in some examples, the discrepancy may be determined to exist when the GPS data does not match expected signal strength provided as output by the machine learning algorithm.

At operation 1308, a determination may be performed as to whether the discrepancy may be acceptable. The discrepancy may represent inconsistencies between the signal strength of the GPS data received at 1302 and the expected signal strength obtained from the historical navigation data. The UAV may compare the discrepancy to a threshold representing a limit on what may be acceptable. If the discrepancy exceeds the threshold, operation 1310 may be performed, by which potential GPS spoofing may be determined. Otherwise, operation 1302 may be performed, by which additional GPS data may be received. The loop between operations 1302 and 1308 may represent a monitoring of the received GPS data to detect the spoofing. As explained herein above, the monitoring may be continuous (e.g., operation 1302 immediately followed after operation 1308) or intermittent (e.g., operation 1302 may follow operation 1308 based on a time interval or based on a location checkpoint).

Different techniques may be used to generate and set the threshold. In an example, the value of the threshold may be a function of the accuracy of a navigation sensor or of an aggregated accuracy of multiple navigation sensors used to collect data from which an expected signal strength was derived. In another example, the threshold may be set based on controlled testing of the UAV and/or GPS data sources (e.g., satellites, ground-based sources, etc.) to determine the limit on the acceptable discrepancy. In some examples, machine learning algorithms may be implemented to analyze historical data (e.g., historically received GPS data, sensor data of the UAV, current environmental/topographical conditions, etc.) to compute the optimal or a best fitted threshold. Accordingly, given current conditions, the machine learning algorithm may be configured to provide a threshold value by which the signal strength of the received GPS data is expected/allowed to deviate from the expected signal strength. If historical data related to other UAVs is used, the UAV and the other UAVs may share at least a common attribute. For instance, the other UAVs may be of a same type as, share common technical capabilities with, and/or have performed similar delivery missions as the UAV. In a further example, the threshold may be a function of the item. For instance, the higher the value of the item, the smaller the value of the threshold may be. This may ensure that, for high valued items, small discrepancies may alert of potential spoofing, thereby providing incremented security and protection for the item delivery.

Additionally, the UAV may dynamically adjust the threshold. For example, if environmental conditions change and report of the change is provided to the UAV (e.g., an expected barometric pressure drop because of a weather update), the UAV may accordingly adjust the threshold (e.g., utilizing a machine learning algorithm or another suitable method). In another example, one or more reports of detected GPS spoofing at a location current to the UAV location may cause the UAV to adjust the threshold. In such a case, the UAV may reduce the threshold to heighten the scrutiny around detecting the spoofing, thereby providing additional security and protection. Such reports may be received from other UAVs and/or central stations.

At operation 1310, potential spoofing may be detected. In an example, because the discrepancy may exceed the threshold, the UAV may determine that the GPS data may be spoofed. The likelihood of the spoofing may be a function of how large the discrepancy may be (or by how much the discrepancy may exceed the threshold). The larger the discrepancy, the higher the likelihood may be.

At operation 1312, the GPS spoofing may be confirmed. In particular, the UAV may perform different actions to confirm the GPS spoofing (e.g., to determine whether the likelihood is valid, should be increased, or should be decreased). Various techniques may be used. In an example, the UAV may keep monitoring and analyzing the signal strengths of received GPS data for a pre-determined period of time. In another example, the UAV may collect additional sensor data from additional navigation sensors and use the additional data for the GPS data comparison. For instance, if the UAV had collected data from an altimeter only, the UAV may also collect data from a gyroscope. In yet another example, the UAV may maintain its position for a period of time (e.g., the flight state would show no navigation progress) and may monitor how the GPS data changes during that period of time. If the GPS data changes showing some navigation progress, the spoofing may be confirmed. In a further technique, the UAV may perform any of the other spoofing detection techniques illustrated in FIG. 6-12 to confirm the spoofing.

At operation 1314, a corrective action may be performed. Generally, the UAV may perform a corrective action that may involve directing the autonomous flight, or a portion thereof, independently of and without using the spoofed GPS data. Corrective actions may be further discussed below in connection with FIG. 14.

As described herein above, a combination of corrective actions may be performed upon detection of GPS spoofing. FIG. 14 illustrates one example flow of performing a corrective action. The operations of the example flow may be described as being performed by the UAV (or the computer system thereof). Nonetheless, some or all of the operations of FIG. 14 may be performed at a central station or distributed between the UAV and the central station.

The example flow may start at operation 1402, where a GPS-related message may be received. This message may include information about GPS spoofing detected at a particular location. At operation 1404, data about a maneuver may be accessed. This data may define a particular series of actions that may be performed when arriving to or flying proximate of the particular location. For example, the data may specify that UAV should use sensor data to move to a certain location, change a position (e.g., gain altitude), or other navigation-related actions. The maneuver data may be accessed from a data store local to the UAV or may be received from the central station based on a pull or a push or as part of the UAV deployment.

At operation 1406, the maneuver may be performed. For example, the management system of the UAV may direct the applicable components of the UAV to perform the maneuver. At operation 1408, a determination may be performed as to whether the GPS spoofing may have been resolved. For example, the UAV may monitor and analyze the GPS data received during or after performance of the maneuver. If the analysis indicates that the GPS data may be trusted, the GPS spoofing may accordingly no longer impact the UAV. Thus, the received GPS data may trusted again. If GPS spoofing is resolved, operation 1410 may be performed, by which the UAV may revert to using the received GPS data for its autonomous navigation. Operation 1410 may also include the UAV reporting the success of the maneuver to the central station. Otherwise, operation 1412 may be performed, by which the UAV may report that the maneuver may not have successfully resolved the GPS spoofing. The reporting under operations 1410 and 1412 may enable the central station to collect data about the success of the maneuver and to correlate such successes with different spoofing locations.

At operation 1414, a determination may be made as to whether another maneuver may be performed. This operation may enable the UAV to attempt multiple maneuvers, as applicable, until resolution of the spoofing or until maneuvers may no longer be attempted. The data about the maneuvers may be accessible from the data store similar to what is described in connection with operation 1404. The determination may depend on a number of contexts. The contexts may be associated with the UAV, the central station, and/or the item. For example, if the UAV is capable of performing additional maneuvers, such maneuvers may be performed. In another example, the central station may transmit data about additional maneuvers to the UAV. These additional maneuvers may be based on collected data from multiple UAVs. This collected data may allow the central station to maintain a map of GPS spoofing hot spots and successful maneuvers. In yet another example, the value of the item (e.g., monetary or delivery urgency value) may specify the number of attempts. The higher the value, the larger the number of attempts may be.

If an additional maneuver should be performed, operation 1406 may be followed to perform the additional maneuver. Otherwise, operation 1416 may be followed. At operation 1416, the UAV may enter a safe state. For example, the UAV may land, enter an idle mode, and provide information associated with the landing to the central station.

Figure 15:
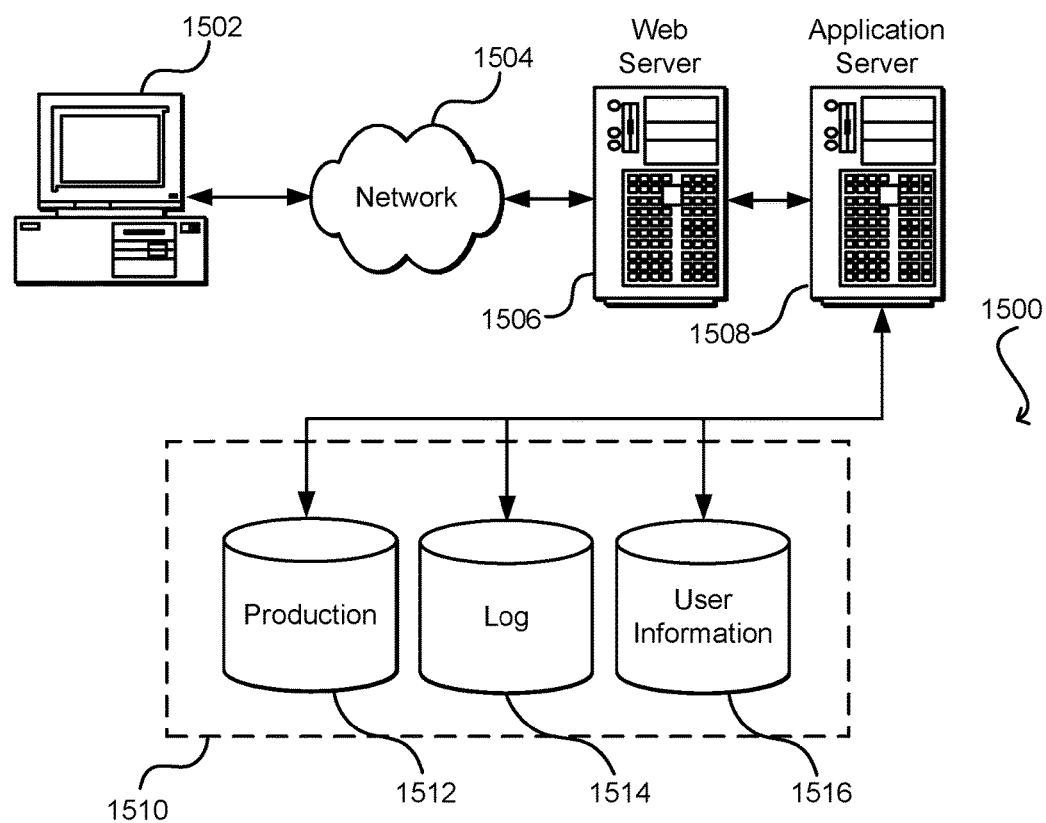
FIG. 15 illustrates an example architecture for providing a network-based resource, according to embodiments.

Turning to FIG. 15, the figure illustrates aspects of an example environment 1500 capable of implementing the above-described structures and functions. As will be appreciated, although a Web-based environment is used for purposes of explanation, different environments may be used, as appropriate, to implement various embodiments. The environment includes an electronic client device 1502, which may include any appropriate device operable to send and receive requests, messages, or information over an appropriate network(s) 1504 and convey information back to a user of the device. Examples of such client devices include personal computers, cell phones, handheld messaging devices, laptop computers, set-top boxes, personal data assistants, electronic book readers, or any other computing device. The network(s) 1504 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 1508 provides access control services in cooperation with the data store 1510, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1502 and the application server 1508, may be handled by the Web server 1506. It should be understood that the Web and application servers 1506 and 1508 are not required and are merely example components, as structured code discussed herein may be executed on any appropriate device or host machine as discussed elsewhere herein.

The data store 1510 may include several separate data tables, databases or other data storage mechanisms and media for storing data relating to a particular aspect. For example, the data store 1510 illustrated includes mechanisms for storing production data 1512 and user information 1516, which may be used to serve content for the production side. The data store 1510 is also shown to include a mechanism for storing log data 1514, which may be used for reporting, analysis, or other such purposes. It should be understood that there may be many other aspects that may need to be stored in the data store 1510, such as for page image information and to access correct information, which may be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 1502. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of environment 1500 in FIG. 15 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method, comprising:
receiving, by a computer system of an unmanned aerial vehicle (UAV), global positioning system (GPS) data, the computer system configured to direct a flight of the UAV to deliver an item from a source to a destination based at least in part on the GPS data;
determining, by the computer system, a received signal strength of the GPS data;
determining, by the computer system, an expected signal strength corresponding to the GPS data;
comparing, by the computer system, the received signal strength of the GPS data to the expected signal strength;
determining, by the computer system, a discrepancy between the received signal strength the expected signal strength;
determining, by the computer system, that the GPS data is spoofed based at least in part on the discrepancy; and
directing, by the computer system, a portion of the flight independently of the GPS data that is spoofed.

2. The computer-implemented method of claim 1, wherein the expected signal strength comprises an expected power range for the GPS data, and wherein determining the discrepancy between the received signal strength and the expected signal strength comprises determining that the received signal strength of the GPS data is outside the expected power range.

3. The computer-implemented method of claim 1, wherein obtaining expected signal strength information comprises:
obtaining, by the computer system, historical navigation data related to the flight of the UAV, the historical navigation data indicating at least one historical signal strength of previously-received GPS data; and
calculating, by the computer system, the expected signal strength based at least in part on the historical navigation data.

4. The computer-implemented method of claim 1, further comprising:
determining one or more signal strength increases corresponding to one or more communications channels of the UAV, wherein determining that the GPS data is spoofed is further based at least in part on the one or more signal strength increases.

5. One or more non-transitory computer readable media comprising instructions that, when executed with a computer system configured to direct a flight of a UAV to deliver an item from a source to a destination based at least in part on external navigation data, cause the computer system to at least:
receive the external navigation data from a source external to the UAV;
determine a received signal strength of the external navigation data;
determine an expected signal strength corresponding to the external navigation data;
determining that the external navigation data is spoofed based at least in part on calculating a discrepancy between the received signal strength and the expected signal strength; and
directing a portion of the flight independently of the external navigation data that is spoofed.

6. The one or more non-transitory computer readable media of claim 5, wherein executing the instructions further causes the computer system to at least:
detect a change in signal strength of the external navigation data;
obtain vehicle operations data associated with autonomous operations of the UAV;
determine a discrepancy between the vehicle operations data and the external navigation data;
determine that the external navigation data is untrusted further based at least in part on at least one of: the change in the signal strength and the discrepancy between the vehicle operations data and the external navigation data; and
generate a corrective action associated with directing the autonomous navigation of the UAV to be performed independently of the external navigation data that is untrusted.

7. The one or more non-transitory computer readable media of claim 6, wherein executing the instructions to determine the discrepancy between the vehicle operations data and the external navigation data further causes the computer system to at least:
generate a state associated with the autonomous operations, the state comprising an operations parameter determined over time based at least in part on the external navigation data;
generate a remote state associated with the autonomous operations, the remote state comprising a remote operations parameter determined over time based at least in part on the vehicle operations data, the vehicle operations data being received from a remote source distinct from the vehicle; and
determine a discrepancy between the operations parameter and the remote operations parameter that exceeds a threshold difference value, wherein the operations parameter and the remote operations parameter individually comprise at least one of: a speed, a heading, an acceleration, an altitude, a yaw, a roll, or a pitch of the vehicle.

8. The one or more non-transitory computer readable media of claim 6, wherein determining the discrepancy between the vehicle operations data and the external navigational data further causes the computer system to at least:
determine a current location of the vehicle based at least in part on the external navigation data;
obtain pre-determined navigational route from the vehicle operations data, the pre-determined navigational route indicating an expected navigational route for the autonomous operations of the vehicle; and
compare the pre-determined navigation route data to the current location of the vehicle, wherein the comparison indicates that the current location of the vehicle deviates from the pre-determined navigation route.

9. The one or more non-transitory computer readable media of claim 6, wherein determining the discrepancy between the vehicle operations data and the external navigational data further causes the computer system to at least:
obtain sensor data from the vehicle operations data, the sensor data comprising image data of an optical sensor installed on the vehicle;
determine a current location of the vehicle from the external navigation data;
access known image data associated with a known location corresponding to the current location; and
determine the discrepancy based at least in part on a comparison between the image data and the known image data, wherein the discrepancy indicates that the image data and the known image data differ by at least a threshold amount.

10. The one or more non-transitory computer readable media of claim 6, wherein determining the discrepancy between the vehicle operations data and the external navigational data further causes the computer system to at least:
obtain environmental conditions data from the vehicle operations data, the environmental conditions data being associated with a current location of the vehicle; and
determine that the change in signal strength is unrelated to the environmental condition associated with the current location of the vehicle based at least in part on the environmental conditions data.

11. The one or more non-transitory computer readable media of claim 6, wherein the vehicle operations data comprises a navigational map associated with known environmental conditions.

12. A system associated with an unmanned vehicle, the system comprising:
one or more processors; and
one or more non-transitory computer readable media comprising instructions that, when executed with the one or more processors, cause the system to at least:
receive navigation data associated with the unmanned vehicle, the navigation data indicating a current location of the unmanned vehicle;
determine a current signal strength of the navigation data;
obtain historical navigation data, the historical navigation data comprising signal strengths historically encountered along a travel route comprising the current location;
determine an expected signal strength from the historical navigation data, the expected signal strength corresponding to the current location;
determine that a conflict exists between the current signal strength of the navigation data and the expected signal strength;
determine that the navigation data is untrusted based at least in part on the conflict; and
perform a corrective action based at least in part on the determination that the navigation data is untrusted.

13. The system of claim 12, wherein the historical navigation data is collected by the unmanned vehicle or a plurality of unmanned vehicles.

14. The system of claim 12, wherein the historical navigation data is collected by the unmanned vehicle and comprises historical signal strengths previously encountered by the unmanned vehicle prior to arrival at the current location, and where the conflict is determined to exist when the current signal strength exceeds a threshold value with respect to at least one of the historical signal strengths.

15. The system of claim 12, wherein the corrective action comprises:
obtaining vehicle operations data from navigation sensors of the unmanned vehicle; and
confirming that the navigation data is untrusted based at least in part on the vehicle operations data, wherein the corrective action comprises directing autonomous navigation of the unmanned vehicle based at least in part on the vehicle operations data.

16. The system of claim 12, wherein the corrective action comprises:
obtaining vehicle operations data comprising image data of a location of the unmanned vehicle from an imaging sensor of the unmanned vehicle; and
confirming that the navigation data is untrusted based at least in part on the image data.

17. The system of claim 12, wherein the corrective action comprises:
reporting that the navigation data is untrusted to a central station; and
facilitating remote navigation of the unmanned vehicle from the central station.

18. The system of claim 13, wherein the corrective action comprises reporting that the navigation data is untrusted to a remote system different from the system associated with the unmanned vehicle.

19. The system of claim 12, wherein determining that the navigation data is untrusted is further based at least in part on the current signal strength exceeding a threshold value.

20. The system of claim 12, wherein the instructions that, when executed, determine that the conflict exists between the current signal strength of the navigation data and the expected signal strength further causes the system to at least:
determine a threshold difference value by which the current signal strength is allowed to differ from the expected signal strength, the threshold difference value being determined based at least in part on a machine learning algorithm, the machine learning algorithm being trained based at least in part on historical signal strengths received by the unmanned vehicle or a plurality of unmanned vehicles; and
determine that the current signal strength exceeds the threshold difference value with respect to the expected signal strength corresponding to the current location.

* * * * *